United States Patent
Yamada

(10) Patent No.: US 7,672,305 B2
(45) Date of Patent: Mar. 2, 2010

(54) CROSSBAR SWITCH, INFORMATION PROCESSOR, AND TRANSFER METHOD

(75) Inventor: Yoshihisa Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 618 days.

(21) Appl. No.: 11/540,514

(22) Filed: Oct. 2, 2006

(65) Prior Publication Data
US 2007/0076701 A1  Apr. 5, 2007

(30) Foreign Application Priority Data
Oct. 4, 2005  (JP) .............................. 2005-291368

(51) Int. Cl.
*H04L 12/56* (2006.01)
(52) U.S. Cl. .................. 370/389; 370/401; 712/225
(58) Field of Classification Search .................. 370/389, 370/412
See application file for complete search history.

(56) References Cited

U.S. PATENT DOCUMENTS

| | | | |
|---|---|---|---|
| 6,801,978 B2 | 10/2004 | Sota | |
| 2004/0160970 A1* | 8/2004 | Dally et al. | 370/412 |
| 2009/0024833 A1* | 1/2009 | Deneroff et al. | 712/29 |

FOREIGN PATENT DOCUMENTS

| | | |
|---|---|---|
| JP | 2003-337807 (A) | 11/2003 |
| JP | 2004-102607 A | 4/2004 |

* cited by examiner

*Primary Examiner*—Jayanti K Patel
*Assistant Examiner*—Bo Hui A Zhu
(74) *Attorney, Agent, or Firm*—Foley & Lardner LLP

(57) ABSTRACT

Port input sections generate, when the head flits of a packet are stored in the first and second registers, first and second mediation request signals destined for a desired request destination, and further generate a first notification signal used to notify the presence or absence of the first mediation request signal destined for any request destination. Upon reception of a mediation result signal, the port input sections output the flit from the first register and sequentially forward flits to be stored in the first register and the second register, and the port output sections sequentially output the flit outputted from the first register of any one of the port input sections to the node. A register suppresses a delay of the mediation result signal caused by a transmission path in a predetermined range, upon reception of the first and second mediation request signals sent thereto and the first notification signal, transmit and receive each mediation result signal between the mediation sections as a second notification signal; and perform mediation at the mediation circuit to output a mediation result signal.

21 Claims, 16 Drawing Sheets

CROSSBAR SWITCH, INFORMATION PROCESSOR, AND TRANSFER METHOD

BACKGROUND OF THE INVENTION

1. Field of the Invention

The present invention relates to a crossbar switch for transferring, between nodes, data that is exchanged mutually by a plurality of nodes.

2. Description of the Related Art

As described in, for example, JP 2004-102607 A, a crossbar switch is provided inside an information processor including a plurality of processor nodes and a plurality of I/O nodes, and has plural ports to connect to the processor nodes and to the I/O nodes. The crossbar switch dynamically selects and connects a desired port input section and a desired port output section to each other, enabling data transfer between the process or node and the I/O node. A mediation circuit determines the port input section and the port output section to be connected to each other.

The crossbar switch transfers data on a packet basis, so the mediation circuit performs mediation between ports on a packet basis. A packet is made of one or more flits. A flit is fixed-width data which is transferred at one cycle. If a minimum packet made of one flit is transferred, the crossbar switch has to perform mediation for each cycle in order to process the data with the throughput being maintained. In this kind of crossbar switches, a mediation result signal outputted from the mediation circuit is required for control of both the port input section and the port output section.

As an example, the crossbar switch has a configuration in which the mediation circuit is disposed in each port output section. This configuration requires a path used for transmitting a mediation request signal outputted from the port input section to the mediation circuit disposed in the port output section, and a path used for transmitting a mediation result signal outputted from the mediation circuit to the port input section. Further, the signals have to be transmitted through the paths within one cycle. The configuration, in which the crossbar switch is implemented in one LSI, includes a portion where the distance between the port input section and the port output section is long, causing a problem in that a high-frequency operation is difficult to perform.

If a register for storing the signals is provided at the middle in order to shorten the paths, used for transmitting the signals between the port input section and the port output section within one cycle, the path length for one cycle is shortened. In this case, however, a delay is caused by a cycle of storing a signal in the register and of reading the signal therefrom. This makes the mediation for each cycle difficult and causes a problem of a decreased data throughput.

Even in the other configurations, there is a possibility that it is hard to perform the high-frequency operation or to maintain the throughput, depending on the path length between the mediation circuit and the port input section and port output section.

SUMMARY OF THE INVENTION

An object of the present invention is therefore to provide a crossbar switch capable of performing a high-frequency operation without decreasing throughput.

In order to achieve the above-mentioned object, according to an aspect of the invention, there is provided a crossbar switch provided between a plurality of nodes, for transferring a packet which is made of at least one flit between the plurality of nodes, including:

a plurality of port input sections each connected to any one of the plurality of nodes, for storing two heed flits sent from the node in a first register serving as an output stage and a second register serving as a previous stage of the output stage, for generating a first mediation request signal destined for a desired request destination when a head flit of the packet is stored in the first register, for generating a second mediation request signal destined for the desired request destination when the head flit is stored in the second register, for generating a first notification signal which is used to notify whether or not the first mediation request signal destined for any request destination is present, and for, upon reception of a mediation result signal obtained through mediation using the first mediation request signal, the second mediation request signal, and the first notification signal, outputting a flit from the first register according to the mediation result signal and sequentially forwarding flits to be stored in the first register and the second register;

a plurality of port output sections each connected to any one of the plurality of nodes and to all the plurality of port input sections, and for, upon reception of the mediation result signal, sequentially outputting to the node the flit outputted from the first register of any one of the plurality of port input sections according to the mediation result signal; and a plurality of mediation sections provided corresponding to the plurality of port output sections, and each including, at one of a previous stage and a subsequent stage of a mediation circuit, a register for suppressing a delay of the mediation result signal caused by a transmission path in a predetermined range, the plurality of mediation sections each functioning, upon reception of the first mediation request signal and the second mediation request signal destined therefor, and the first notification signal, which are sent from each of the plurality of port input sections, to transmit and receive each mediation result signal between the plurality of mediation sections as a second notification signal, to perform mediation at the mediation circuit based on the first mediation request signal, the second mediation request signal, the first notification signal, and the second notification signal, and to give the mediation result signal to the port input section and the port output section.

Therefore, according to the present invention, it is possible to perform the high-frequency operation by providing the mediation circuit with the register for suppressing a delay caused by a transmission path in a predetermined range, and to perform the mediation without decreasing throughput by using the second mediation request signal corresponding to the second register at the previous stage for the mediation, even when packets each made of one flit continue.

Further, the plurality of mediation sections may each include a port request generating circuit for making a mediation request sent from each of the plurality of port input sections valid and giving the mediation request to the mediation circuit in one of a case where the port input section has the first mediation request signal and is not given a transmission permission for the first mediation request signal, a case where the port input section does not have the first mediation request signal, and a case where the port input section has the first mediation request signal, is already given the transmission permission for the first mediation request signal, and has the second mediation request signal.

Further, the plurality of port input sections and the plurality of port output sections may make pairs, the pairs each connecting to the same node, the crossbar switch may further include a port diagnosing section for diagnosing a failure related to one of the pairs, and upon reception of a notification of a failure related to the pair of the port input section and the port output section from the port diagnosing section, the corresponding mediation section forcibly may give a transmission permission for the first mediation request signal destined therefor.

Accordingly, when a failure related to a port occurs, a transmission permission is given, without conditions, to the first mediation request signal sent from a port that belongs to another partition that is normally operated, so packets of another port input section that shares the port output section related to the failure can be taken out and discarded to prevent the packets from being stuck.

Further, the port input section may have a failure detecting circuit for detecting a failure occurring in the port input section and for notifying the port output section of the failure, and while the failed port input section is transferring a packet destined for the node, the port output section may insert a dummy flit working as a remaining flit to the packet being transferred to the node, and complete the transmission of the packet to the node.

Accordingly, even when a flit cannot be sent from the port input section to the port output section due to a failure occurring in the port input section, the port output section inserts a dummy flit to the packet being transferred to complete the transmission, so it is possible to prevent the port output section from keeping waiting for the remaining flit and to prevent another port input section that shares the port output section from being down.

Further, when the failure occurs and if the packet being transferred from the failed port input section has not yet started to be transmitted to the node, the port output section may complete the packet transmission without sending the packet.

Accordingly, it is possible to avoid an adverse effect on a node, caused by sending a packet including a header whose content may be destroyed due to a failure occurring in the port input section.

Further, when the failure is notified at the same time when the head flit of the packet is transferred, the port output section may judge that the transmission of the packet is not started.

Further, the port output section may calculate the number of dummy flits to be inserted, from a header included in the head flit.

Further, the plurality of nodes may be divided into a plurality of partitions and used.

Further, the first notification signal may be obtained by applying a logical OR operation to all first mediation request signals destined for all of the plurality of mediation sections.

Accordingly, since a signal obtained by applying the logical OR operation to the mediation request signals destined for all the port output sections is used as the first notification signal, signals to be destined for all the port output sections can be generated at the common OR circuit, and the circuit scale can be reduced by reducing the number of signal lines between the port input sections and the port output sections.

Further, each of the plurality of mediation sections may be disposed inside the corresponding one of the plurality of port output sections.

Accordingly, in a configuration where the mediation section is disposed in the port output section and signal paths tend to be long, it is possible to allow both the high-frequency operation and the prevention of a decreased throughput.

Further, part of the plurality of port input sections and part of the plurality of port output sections may be mutually connected via crossbar switches instead of the nodes.

According to the present invention, it is possible to perform the high-frequency operation by providing the mediation circuit with the register for suppressing a delay caused by a transmission path in a predetermined range, and to perform the mediation without decreasing throughput by using the second mediation request signal corresponding to the second register at the previous stage for the mediation, even when packets each made of one flit continue.

DETAILED DESCRIPTION OF THE PREFERRED EMBODIMENTS

Embodiments of the present invention will be described in detail with reference to the accompanying drawings.

First Embodiment

Figure 1:
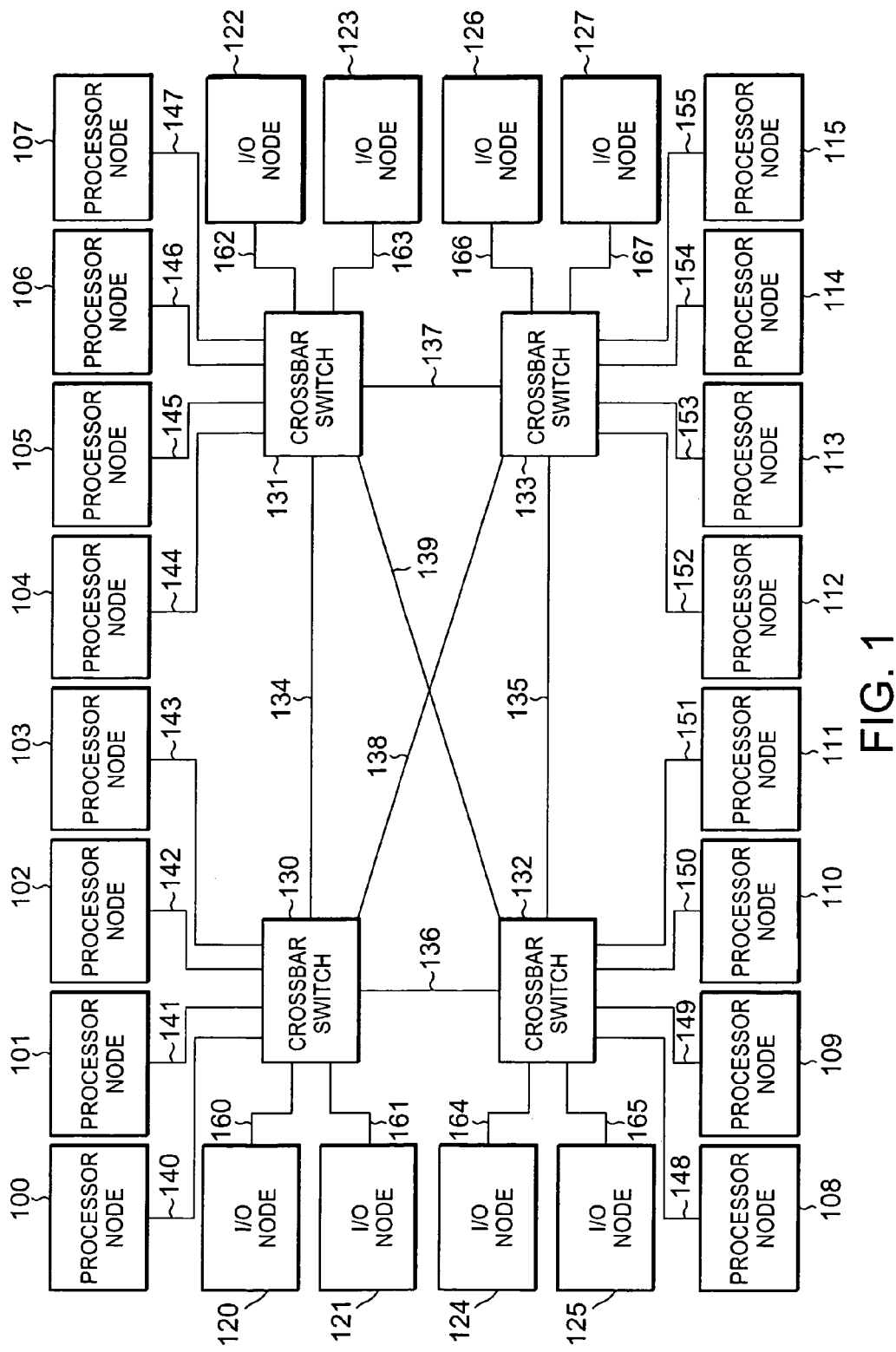
FIG. 1 is a diagram showing a configuration example of an information processor using crossbar switches according to a first embodiment.

FIG. 1 is a diagram showing a configuration example of an information processor using crossbar switches according to a first embodiment of the present invention. Referring to FIG. 1, the information processor of this embodiment has: sixteen processor nodes 100 to 115; eight I/O nodes 120 to 127; and four crossbar switches 130 to 133. The processor nodes 100 to 115 and the I/O nodes 120 to 127 are connected to one another via the crossbar switches 130 to 133.

Each of the four crossbar switches 130 to 133 is connected to four processor nodes and two I/O nodes. The four crossbar switches 130 to 133 are connected to each other.

For example, the crossbar switch 130 is connected to the processor node 100 via a signal line 140, the processor node 101 via a signal line 141, the processor node 102 via a signal line 142, and the processor node 103 via a signal line 143. Further, the crossbar switch 130 is connected to the I/O node 120 via a signal line 160, and the I/O node 121 via a signal line 161. The crossbar switch 130 is connected to the crossbar switch 131 via a signal line 134, the crossbar switch 132 via a signal line 136, and the crossbar switch 133 via a signal line 138.

Each of the processor nodes 100 to 115 is made of one or plural processors (not shown) and a main storage (not shown). Each of the I/O nodes 120 to 127 is composed of an I/O controller (not shown), an I/O device (not shown), and the like.

Note that the information processor may have a configuration other than that shown in FIG. 1. For example, the information processor may have a small-scale configuration in which two processor nodes and one I/O node are connected via one crossbar switch. Alternatively, the information processor may have a large-scale configuration in which 64 processor nodes and 32 I/O nodes are connected via 16 crossbar switches.

In this embodiment, the processor node and the I/O node are separately defined as described above, but the present invention is not limited to this configuration. As another example, the information processor may have a configuration in which a plurality of nodes are connected to each other via a crossbar switch, each of the plurality of nodes being composed of a processor, a main storage, an I/O controller, an I/O device, and the like.

Figure 2:
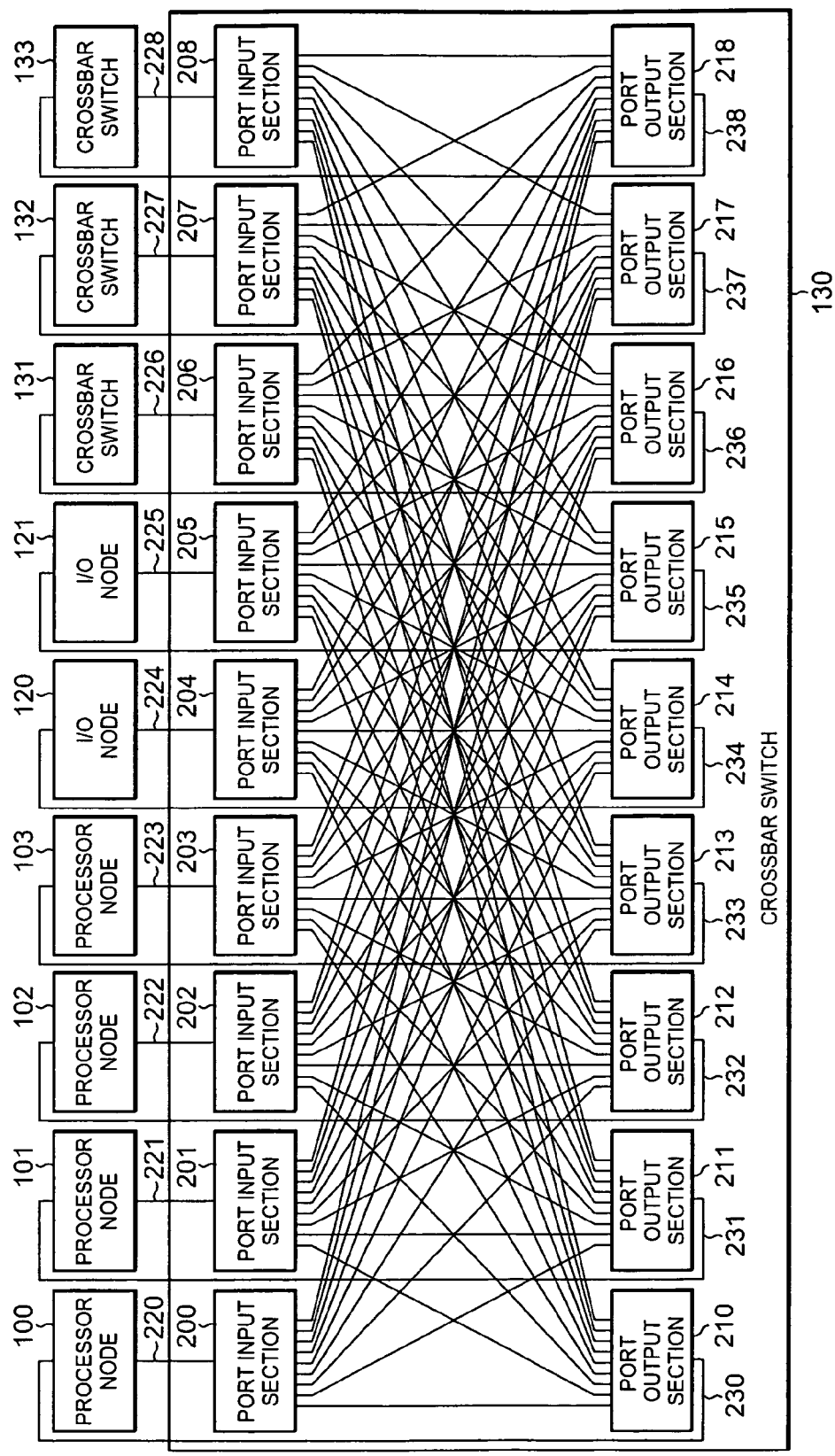
FIG. 2 is a block diagram showing a configuration of each crossbar switch according to the first embodiment.

FIG. 2 is a block diagram showing a configuration of the crossbar switch according to the first embodiment. A description is given of the crossbar switch 130 since the crossbar switches 130 to 133 have the same configuration. Referring to FIG. 2, the crossbar switch 130 has nine port input sections 200 to 208 and nine port output sections 210 to 218. Each of the port input sections 200 to 208 is connected to all of the port output sections 210 to 218, and each of the port output sections 210 to 218 is connected to all of the port input sections 200 to 208. The port input sections 200 to 208 and the port output sections 210 to 218 make pairs, respectively. In each pair, the port input section and the port output section connect to the same destination.

The pair of the port input section and the port output section is defined as a port. For example, a port connected to the processor node 100 is a pair of the port input section 200 and the port output section 210. In FIG. 2, a pair of a signal line 220 which connects the port input section 200 and the processor node 100 and a signal line 230 which connects the port output section 210 and the processor node 100 corresponds to the signal line 140 shown in FIG. 1.

In other words, the nine ports of the crossbar switch 130 are connected to the processor nodes 100 to 103, the I/O nodes 120 to 121, and the crossbar switches 131 to 133, respectively. Note that the nine ports have the same configuration, so the ports can be connected to the above-mentioned nodes in any combination, and the ports can be connected to other nodes.

Figure 3:
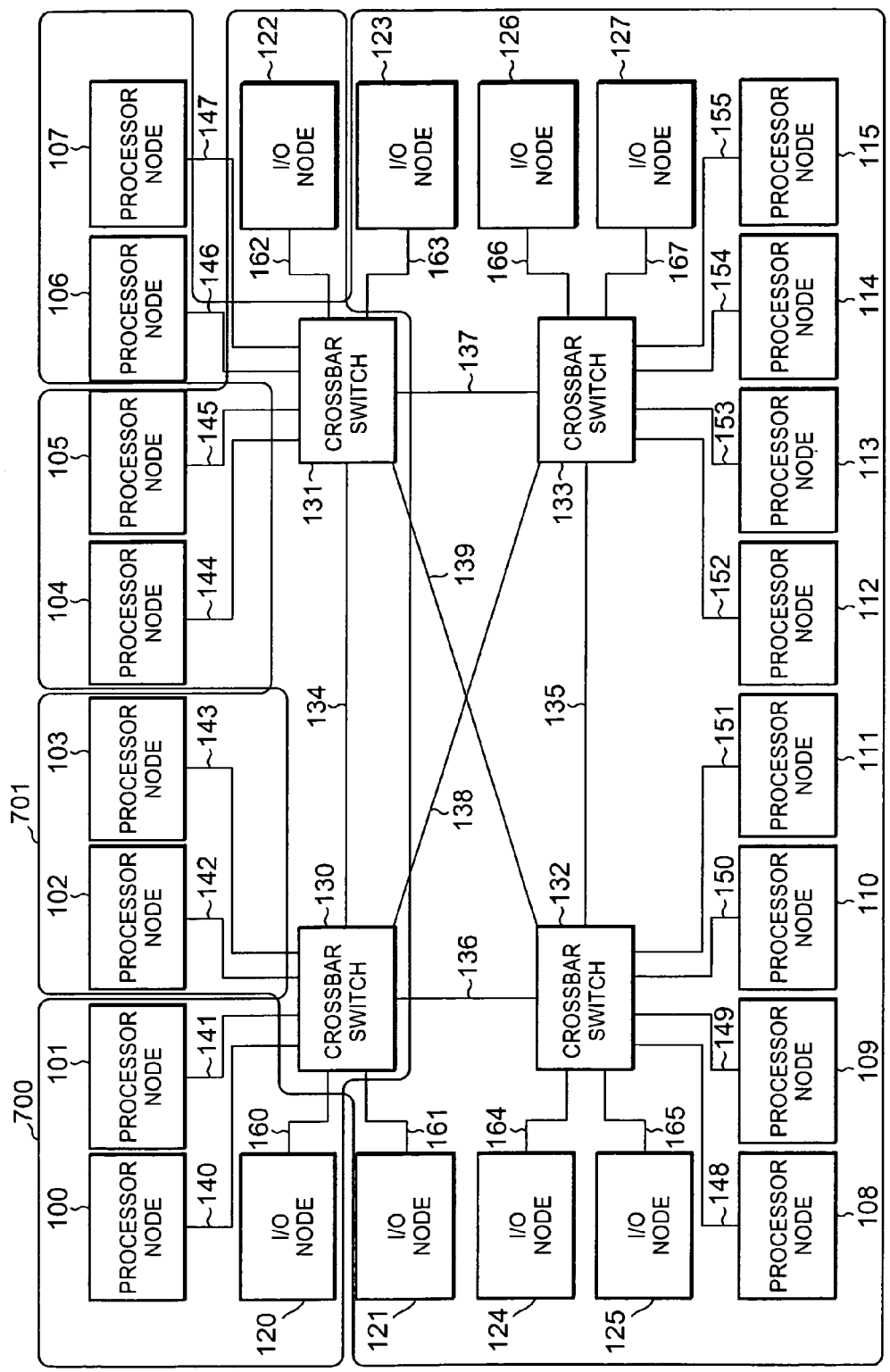
FIG. 3 is a diagram showing a configuration example in which the information processor shown in FIG. 1 is divided into two partitions.

FIG. 3 is a diagram showing a configuration example in which the information processor shown in FIG. 1 is divided into two partitions. The processor nodes 100, 101, 104, and 105, the I/O nodes 120 and 122, and the crossbar switches 130 and 131 belong to a partition 700. The processor nodes 102, 103, 106, 107, and 108 to 115, the I/O nodes 121 and 123 to 127, and the crossbar switches 130 to 133 belong to a partition 701. The information processor is divided into two partitions in this embodiment, but the information processor may be divided into three or more.

In each of the partition 700 and the partition 701, an independent operating system (OS) is operated, so it is preferable that one partition be not down due to a failure of the other partition. In particular, since the crossbar switches 130 and 131 belong to both of the partition 700 and the partition 701, it is preferable that an influence caused by a failure be blocked in each port.

Figure 4:
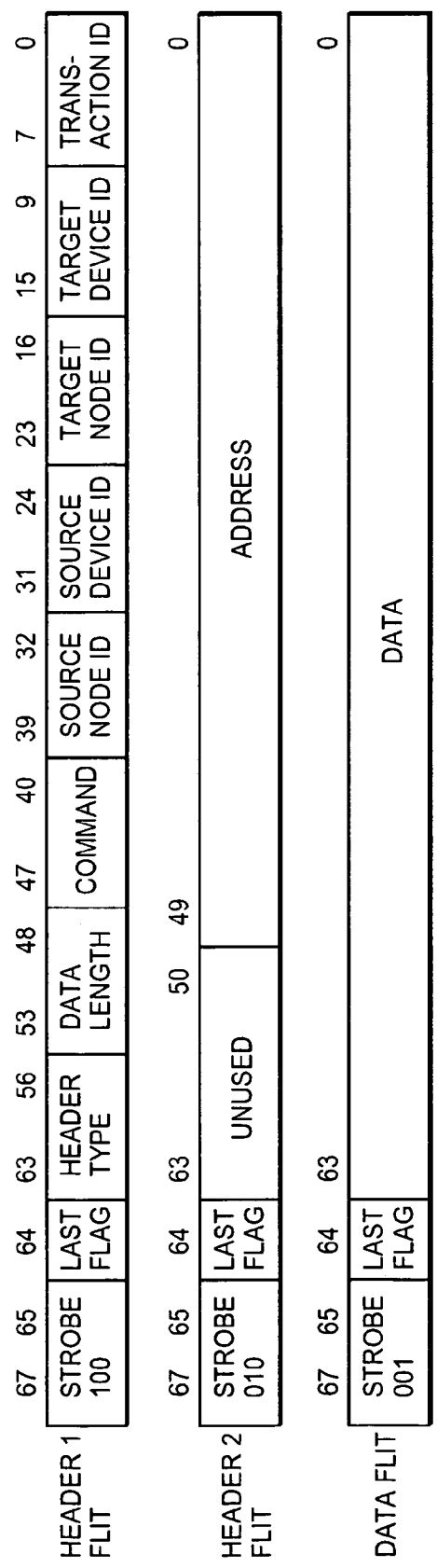
FIG. 4 is a diagram showing examples of transfer formats used in the information processor.

FIG. 4 is a diagram showing examples of transfer formats used in the information processor. Here, a packet is used as a logical transfer unit, and the packet is made of one or more flits. A flit has a fixed bit width, and the flit has a width of 68 bits in this embodiment. There are three types of flits, i.e., a header 1 flit, a header 2 flit, and a data flit. FIG. 4 shows the transfer formats of the three types of flit.

Referring to FIG. 4, bit 67 to bit 65 define "strobe" in each of the flits, indicating whether the flit is valid or invalid, and the type of the flit. A value of "000 (binary)" indicates that the flit is invalid. A value of "100 (binary)" indicates that the flit is valid and is a header 1 flit. A value of "010 (binary)" indicates that the flit is valid and is a header 2 flit. A value of "001 (binary)" indicates that the flit is valid and is a data flit. Note that this definition is merely one example, and information of "strobe" may be expressed by two encoded bits in another example.

The packet includes one header 1 flit; zero or one header 2 flit; and zero, one, two, four, eight, or sixteen data flits. Thus, a minimum packet includes one flit. A maximum packet includes 18 flits.

Referring back to FIG. 4, bit 64 defines "last flag" in each of the flits, indicating whether the flit is the last flit of a packet or not. A value of "0" indicates that the flit is not the last flit of a packet. A value of "1" indicates that the flit is the last flit of a packet. Note that "last flag" is defined to simplify the circuit configuration, but "last flag" is not essential. Even when "last flag" is not included, the last flit can be obtained from "header type" and "data length" to be described later. Error correction code (ECC) or a parity bit may be added to the flit in order to detect or correct an error.

In bit 63 to bit 0 of the header 1 flit, eight fields are defined, each field having eight bits. Each of the fields is described below. However, field definition thereof is merely an example and can be determined depending on resources included in, a protocol used in, and a topology adopted in the information processor.

A field of "header type" indicates whether the packet includes a header 2 flit or not. A value of "00 (hexadecimal)" indicates that the packet does not include a header 2 flit. A value of "01 (hexadecimal)" indicates that the packet includes a header 2 flit. The other values are undefined.

A field of "data length" indicates the number of data flits included in the packet. A value of "00 (hexadecimal)" indicates that the packet includes no data flit. A value of "01 (hexadecimal)" indicates that the packet includes one data flit. A value of "02 (hexadecimal)" indicates that the packet includes two data flits. A value of "03 (hexadecimal)" indicates that the packet includes four data flits. A value of "04 (hexadecimal)" indicates that the packet includes eight data flits. A value of "05 (hexadecimal)" indicates that the packet includes 16 data flits. The other values are undefined.

A field of "command code" stores code specifying an operation, such as memory read, I/O write, or reply, which is performed with respect to a target device.

A field of "source node ID" stores a number identifying a processor node serving as a packet transfer source or an I/O node serving as a packet transfer source.

A field of "source device ID" stores a number identifying a device serving as a packet transfer source. The device serving as a packet transfer source can be a processor, an I/O controller, a main storage device, and the like.

A field of "target node ID" stores a number identifying a processor node serving as a packet transfer destination or an I/O node serving as a packet transfer destination.

A field of "target device ID" stores a number identifying a device type serving as a packet transfer destination. The device serving as a packet transfer destination can be a processor, an I/O controller, a main storage device, and the like.

Bit 63 to bit 50 in the header 2 flit are unused.

A field of "address" is defined at bit 49 to bit 0, and stores a request target. For example, "command code" indicates the memory read, "address" specifies a memory to be read in the main storage device. In this embodiment, "address" is defined in the header 2 flit as an example. If all pieces of necessary information including "address" are contained in the header 1 flit, the header 2 flit may not be defined.

Bit 63 to bit 0 in the data flit is a field storing data.

Figure 5:
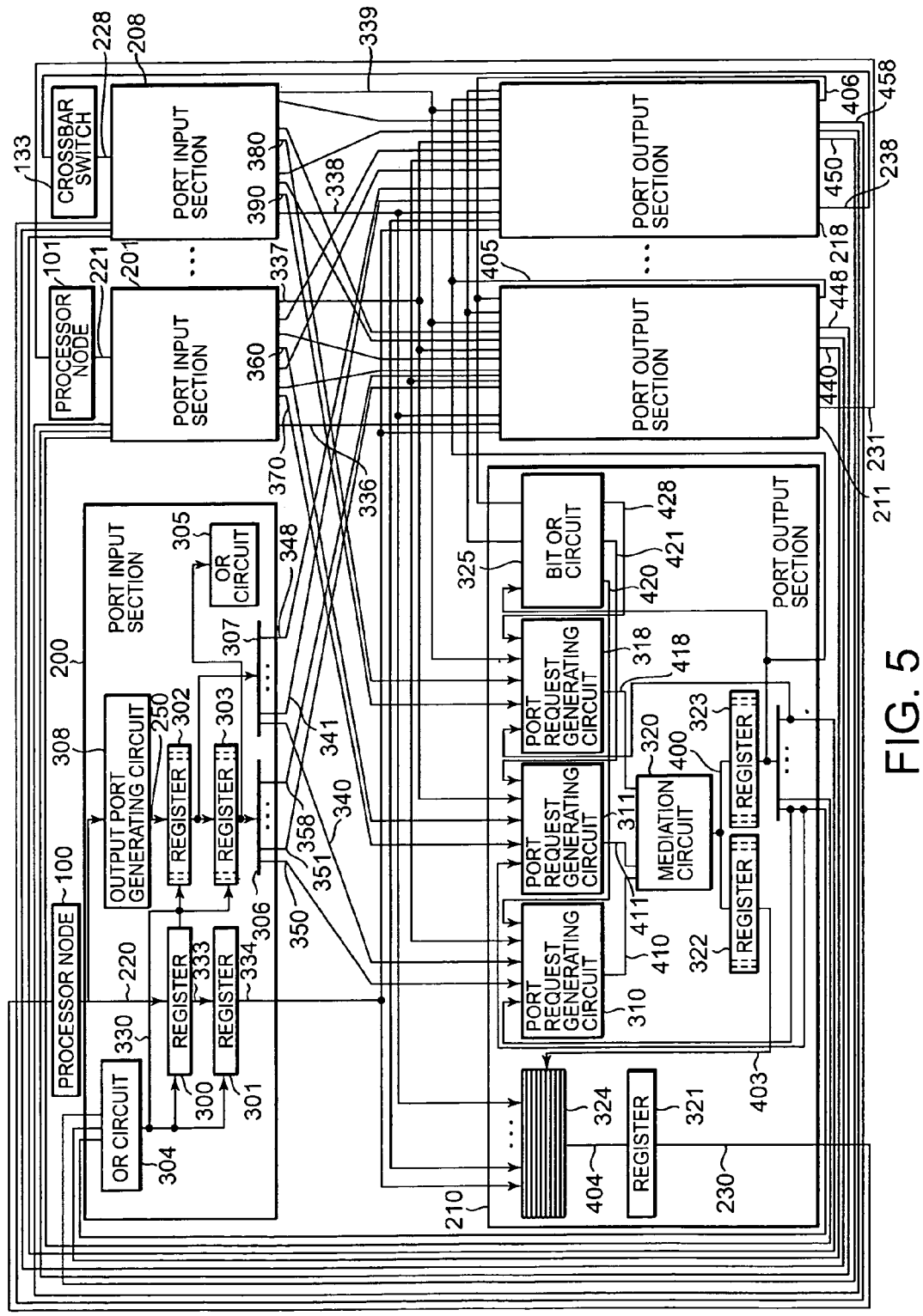
FIG. 5 is a block diagram showing a detailed configuration of a port input section and a port output section of the crossbar switch according to the first embodiment.

FIG. 5 is a block diagram showing a detailed configuration of the port input section and the port output section of the crossbar switch according to the first embodiment. Referring to FIG. 5, the port input section 200 includes registers 300 to 303, OR circuits 304 and 305, bit dividing sections 306 and 307, and an output port generating circuit 308. The port output section 210 includes port request generating circuits 310 to 318, a mediation circuit 320, registers 321 to 323, a selector 324, a bit OR circuit 325, and a bit dividing section 326.

The registers 300 and 301 each have a width of 68 bits and store a flit included in a packet received from the processor node 100. Note that an ECC check circuit, a parity check circuit, a receiving buffer, and the like may be provided between the processor node 100 and the register 300.

A flit signal 220 outputted from the processor node 100 is inputted to the register 300 and the output port generating circuit 308. A flit signal 333 outputted from the register 300 is inputted to the register 301. A flit signal 334 outputted from the register 301 is sent to the selector 324 included in each of the nine port output sections 210 to 218 all connected to the port input section 200 in a nine-to-one manner.

The output port generating circuit 308 decodes the flit signal 220, outputted from the processor node 100, generates a 9-bit mediation request signal 250 specifying an output destination of a header 1 flit, and outputs the mediation request signal 250 to the register 302. If the flit signal 220 is not a header 1 flit, in other words, bit 67 to bit 65 in the flit signal 220 do not have a value of "100 (binary)", the mediation request signal 250 has a value of "000000000 (binary)". In the 9-bit mediation request signal 250, bit 0 to bit 8 correspond to the port output sections 210 to 218, respectively. For example, if the output destination of the header 1 flit is the port output section 210, the mediation request signal 250 has a value of "000000001 (binary)". If the output destination of the header 1 flit is the port output section 211, the mediation request signal 250 has a value of "000000010 (binary)". If the output destination of the header 1 flit is the port output section 218, the mediation request signal 250 has a value of "100000000 (binary)". In order to generate the mediation request signal 250 from a header 1 flit, a method in which a programmable table is prepared in advance and consulted based on "target node ID" and "target device ID" can be used, for example.

The mediation request signal 250 outputted from the output port generating circuit 308 is inputted to the register 302.

The registers 302 and 303 eave have a width of 9 bits and store a mediation request. The mediation request stored in the register 302 corresponds to a header 1 flit stored in the register 300. The mediation request stored in the register 303 corresponds to a header 1 flit stored in the register 301. For example, if a header 1 flit destined for the port output section 210 is stored in the register 300, a mediation request having a value of "000000001 (binary)" is stored in the register 302. If a header 1 flit destined for the port output section 211 is stored in the register 300, a mediation request having a value of "000000010 (binary)" is stored in the register 302. If a header 1 flit destined for the port output section 218 is stored in the register 300, a mediation request having a value of "100000000 (binary)" is stored in the register 302. If a header 1 flit is not stored in the register 300, a mediation request having a value of "000000000 (binary)" is stored in the register 302.

The same applies to the register 303 similarly to the register 302. If a header 1 flit destined for the port output section 210 is stored in the register 301, a mediation request having a value of "000000001 (binary)" is stored in the register 303. If a header 1 flit destined for the port output section 211 is stored in the register 301, a mediation request having a value of "000000010 (binary)" is stored in the register 303. If a header 1 flit destined for the port output section 218 is stored in the register 301, a mediation request having a value of "100000000 (binary)" is stored in the register 303. If a header 1 flit is not stored in the register 301, a mediation request having a value of "000000000 (binary)" is stored in the register 303.

If a header 1 flit is stored in the register 301 and if a transmission permission signal 330 which is outputted from the OR circuit 304 is "0", the packet starting from the header 1 flit cannot be sent, so the registers 300 and 301 holds the values stored therein. In the other cases, the registers 300 and 301 store received flit signals, respectively.

If a header 1 flit is stored in the register 301 and if the transmission permission signal 330, which is outputted from the OR circuit 304, is "0", the registers 302 and 303 hold the values stored therein. In the other cases, the registers 302 and 303 store received mediation request signals 250 and 331, respectively.

It can be judged that the register 301 stores a header 1 flit, from the fact that bit 67 to bit 65 in the register 301 have a value of "100 (binary)".

The OR circuit 304 obtains a logical OR of transmission permission signals 430, 440, . . . , and 450 received from the port output sections 210 to 218, and outputs the result to the registers 300 to 303 as the transmission permission signal 330.

The mediation request signal 331 outputted from the register 302 has 9 bits, and is divided into bit 0 to bit 8 at the bit dividing section 307. Bit 0 to bit 8 are inputted to the port output sections 210 to 218, respectively. Bit 0 is inputted to the port request generating circuit 310 of the port output section 210 as a mediation request signal 340. Bit 1 is inputted to the port output section 211 as a mediation request signal 341. Bit 8 is inputted to the port output section 218 as a mediation request signal 348. Bit 2 to bit 7 (not shown) are inputted to the port output sections 212 to 217, respectively.

A mediation request signal 332 outputted from the register 303 has 9 bits, and is divided into bit 0 to bit 8 at the bit dividing section 306. Bit 0 to bit 8 are inputted to the port output sections 210 to 218, respectively. Bit 0 is inputted to the port request generating circuit 310 of the port output section 210 as a mediation request signal 350. Bit 1 is inputted to the port output section 211 as a mediation request signal 351. Bit 8 is inputted to the port output section 218 as a mediation request signal 358. Bit 2 to bit 7 (not shown) are inputted to the port output sections 212 to 217, respectively.

The mediation request signal 332 outputted from the register 303 is also inputted to the OR circuit 305.

The OR circuit 305 obtains a logical OR of 9 bits of the received mediation request signal 332 and outputs the result as a mediation request OR signal 335 having 1 bit. The mediation request OR signal 335 is inputted to the port output sections 210 to 218, all connected to the port input section 200 in a nine-to-one manner.

In the port output section 210, the port request generating circuit 310 generates a mediation request signal 410 of the port input section 200 from the mediation request signal 340, the mediation request signal 350, and the mediation request OR signal 335 which are received from the port input section 200; the transmission permission signal 430 which is received from the register 323; and a transmission permission OR signal 420 which is received from the bit OR circuit 325, and outputs the generated mediation request signal 410 to the mediation circuit 320.

The port request generating circuit 311 generates a mediation request signal 411 of the port input section 201 from a mediation request signal 360, a mediation request signal 370, and a mediation request OR signal 337 which are received from the port input section 201; a transmission permission signal 431 which is received from the register 323; and a transmission permission OR signal 421 which is received from the bit OR circuit 325, and outputs the generated mediation request signal 411 to the mediation circuit 320.

The port request generating circuit 318 generates a mediation request signal 418 of the port input section 208 from a mediation request signal 308, a mediation request signal 390, and a mediation request OR signal 339 which are received from the port input section 208; a transmission permission signal 438 which is received from the register 323; and a transmission permission OR signal 428 which is received from the bit OR circuit 325, and outputs the generated mediation request signal 418 to the mediation circuit 320.

Port request generating circuits (not shown) that correspond to the port input sections 202 to 207, respectively, generate mediation request signals 412 to 417 with the same configuration as that of the port request generating circuits 310, 311, and 318.

The mediation circuit 320 mediates the mediation request signals 410 to 418 corresponding to the port input sections 200 to 208, and outputs a mediation result signal 400 having 9 bits. Bit 0 to bit 8 of the mediation result signal 400 correspond to the port input sections 200 to 208, respectively. Only bit corresponding to a port input section that obtains a transmission right through the mediation has a value of "1". For example, if the port input section 200 obtains a transmission right, the mediation result signal 400 has a value of "000000001 (binary)". If the port input section 201 obtains a transmission right, the mediation result signal 400 has a value of "000000010 (binary)". If the port input section 208 obtains a transmission right, the mediation result signal 400 has a value of "100000000 (binary)".

If all of the mediation request signals 410 to 418 corresponding to the port input sections 200 to 208 are the mediation result signal 400 has a value of "000000000 (binary)". If the register 322 stores a value other than "000000000 (binary)" and if "last flag" (bit 64) of a flit signal 404 is "0", a packet is being transferred, so the mediation result signal 400 has a value of "000000000 (binary)".

The mediation result signal 400 is inputted to the registers 322 and 323. Note that in response to a mediation request, mediation can be performed with a known circuit using round robin scheduling, for example.

If the register 322 stores a value of "000000000 (binary)" or if "last flag" of the flit signal 404 is "1", the register 322 stores the mediation result signal 400 outputted from the mediation circuit 320. In the other cases, the register 322 holds the value.

A port selection signal 403 outputted from the register 322 is inputted to the selector 324.

The register 323 stores the mediation result signal 400 outputted from the mediation circuit 320 without conditions for each cycle.

The selector 324 selects one of flit signals 334, 336, and 338 received from the port input sections 200 to 208 according to the port selection signal 403, and outputs the selected signal as the flit signal 404. The port input sections 202 to 207 (not shown) output flit signals to the selector 324 as well. Bit 0 to bit 8 of the port selection signal 403 correspond to the flit signals 334, 336, . . . , and 338, which are outputted from the port input sections 200 to 208. For example, if the port selection signal 403 has a value of "000000001 (binary)", the selector 324 selects the flit signal 334 received from the port input section 200. If the port selection signal 403 has a value of "000000010 (binary)", the selector 324 selects the flit signal 336 received from the port input section 201. If the port selection signal 403 has a value of "100000000 (binary)", the selector 324 selects the flit signal 338 received from the port input section 208, and outputs the signal as the flit signal 404.

A transmission permission signal 401 outputted from the register 323 is inputted to the bit OR circuit 325 and the other port output sections 211 to 218. Transmission permission signals 405, . . . , and 406 outputted from the other port output sections 211 to 218 are inputted to the bit OR circuit 325 of the port output section 210. Transmission permission signals that are outputted from the port output sections 212 to 217 (not shown) are also inputted to the bit OR circuit 325.

The transmission permission signal 401 outputted from the register 323 is divided into bit 0 to bit 8 at the bit dividing section 326, and bit 0 to bit 8 are outputted as transmission permission signals 430 to 438. The transmission permission signal 430 is inputted to the port input section 200 and the port request generating circuit 310. The transmission permission signal 431 is inputted to the port input section 201 and the port request generating circuit 311. The transmission permission signal 438 is inputted to the port input section 208 and the port request generating circuit 318. The same applies to the port output sections 212 to 217 (not shown).

The bit OR circuit 325 obtains a logical OR of received transmission permission signals each having 9 bits, for each bit position, and generates transmission permission OR signals 420 to 428 each having 9 bits. For example, if the transmission permission signal 401 is "000000001 (binary)", the transmission permission signal 405 is "000000010 (binary)", and the transmission permission signal 406 is "100000000 (binary)", the transmission permission OR signal 420 has a value of "1", the transmission permission OR signal 421 has a value of "1", the transmission permission OR signals 422 to 427 (not shown) have a value of "0", and the transmission permission OR signal 428 has a value of "1".

The transmission permission OR signal 420 is inputted to the port request generating circuit 310. The transmission permission OR signal 421 is inputted to the port request generating circuit 311. The transmission permission OR signals 422 to 427 (not shown) are inputted to the port request generating circuits 312 to 317. The transmission permission OR signal 428 is inputted to the port request generating circuit 318.

The register 321 stores the flit signal 404 outputted from the selector 324 for each cycle. The flit signal 230 outputted from the register 321 is inputted to the processor node 100. Note that an ECC generating circuit, a transmitting buffer, and the like may be provided between the processor node 100 and the register 321.

Figure 6:
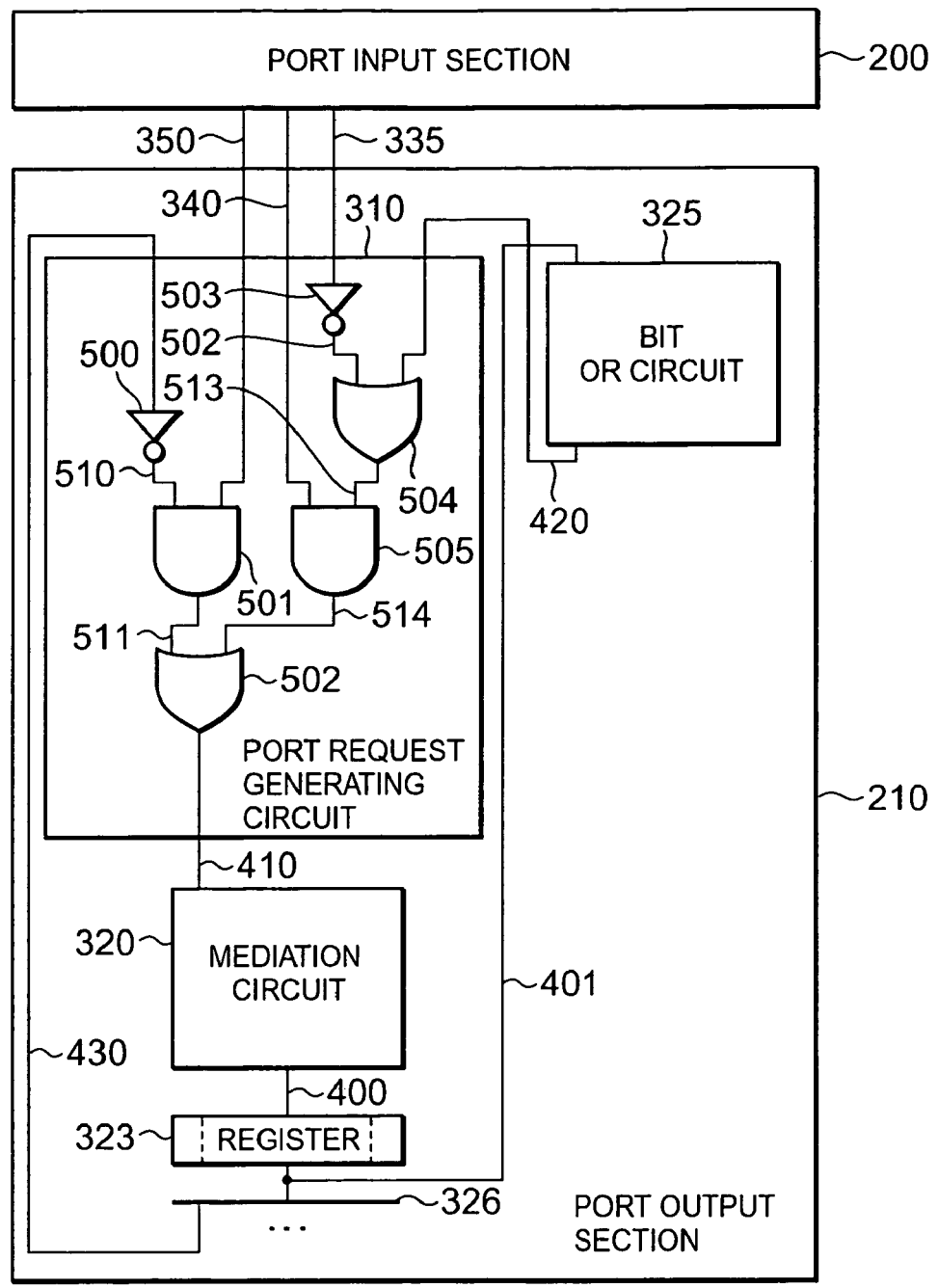
FIG. 6 is a block diagram showing a detailed configuration of a port request generating circuit according to the first embodiment.

FIG. 6 is a block diagram showing a detailed configuration of the port request generating circuit according to the first embodiment.

Referring to FIG. 6, the mediation request OR signal 335 outputted from the port input section 200 is inverted at a NOT circuit 503 and inputted to an OR circuit 504. The OR circuit 504 obtains a logical OR of a signal outputted from the NOT circuit 503 and the transmission permission OR signal 420, outputted from the bit OR circuit 325, and outputs the result to an AND circuit 505 as a signal 513. The AND circuit 505 obtains a logical OR of the signal 513 and the mediation request signal 340 outputted from the port input section 200, and outputs the result to an OR circuit 502 as a signal 514.

The signal 514 has a value of "1" when the register 300 of FIG. 5 stores a header 1 flit destined for the port output section 210 and the register 301 of FIG. 5 stores no header 1 flit, or when the register 300 stores a header 1 flit destined for the port output section 210 and a transmission permission signal with respect to the header 1 flit stored in the register 301 has a value of "1".

The mediation request signal 350 outputted from the port input section 200 is inputted to an AND circuit 501. The transmission permission signal 430 is inverted at a NOT circuit 500 and inputted to the AND circuit 501 as a signal 510. The AND circuit 501 obtains a logical OR of the mediation request signal 350 and the signal 510, and outputs the result to the OR circuit 502 as a signal 511.

The signal 511 has a value of "1" when the register 301 of FIG. 5 stores a header 1 flit destined for the port output section 210 and a transmission permission signal with respect to the header 1 flit is "0". A logical OR of the signal 511 and the signal 514 is obtained at the OR circuit 502, and the mediation request signal 410 of the port input section 200 is generated.

The OR circuit 502 obtains a logical OR of the signal 514 and the signal 511, and outputs the result to the mediation circuit 320 as the mediation request signal 410 of the port input section 200.

With the configuration described above, the crossbar switch of this embodiment judges whether a mediation request sent from each of the nodes connected to the port input sections 200 to 208 is valid or not, and performs mediation based on a valid mediation request.

Figure 7:
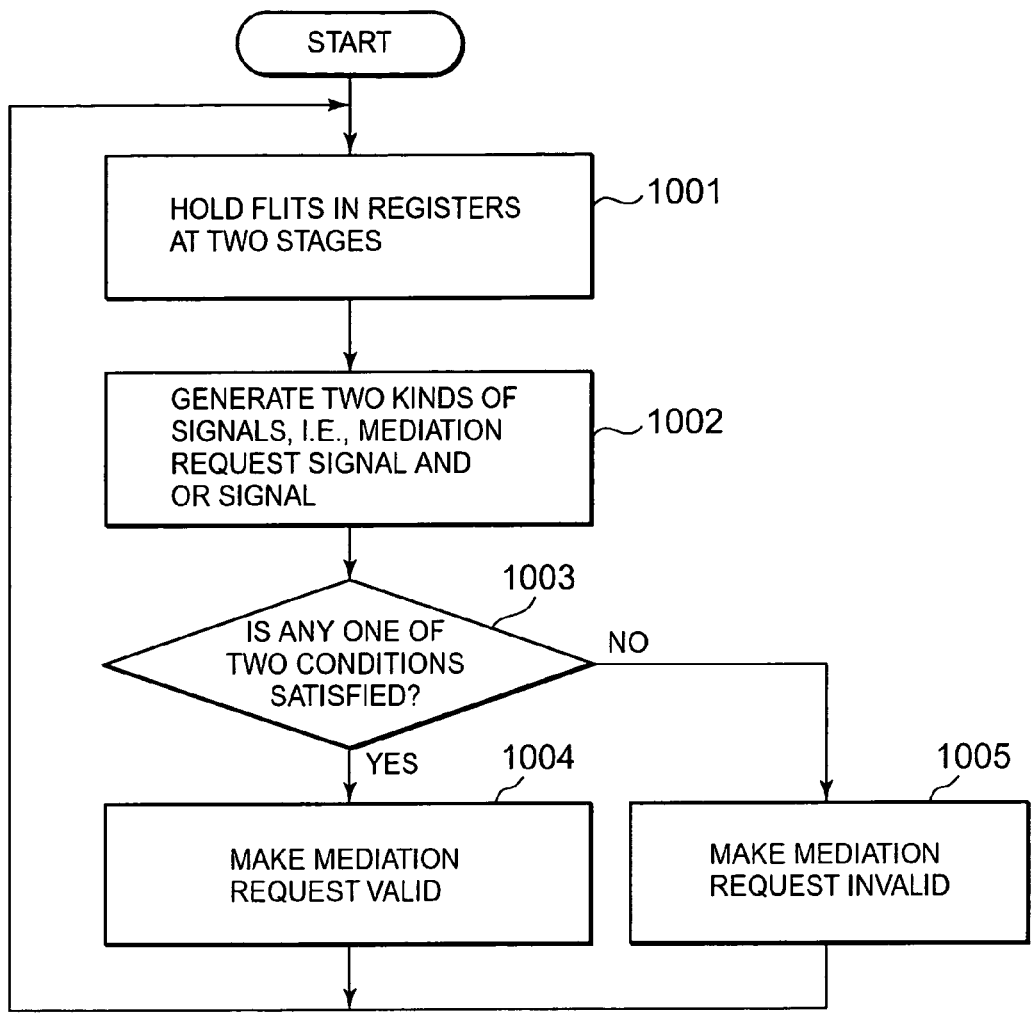
FIG. 7 is a flowchart showing a judgment operation of the crossbar switch according to the first embodiment.

Next, a description is given of validity judgment of a mediation request performed at the crossbar switch of the present invention. FIG. 7 is a flowchart showing a judgment operation of the crossbar switch according to this embodiment. This operation is performed for each port input section.

Referring to FIG. 7, in each of the port input sections 200 to 208, two cycles of flits constituting packets sent from a node are held in the two registers 301 and 300, which are placed at an output stage and its previous stage, respectively (Step 1001).

Then, each of the port input sections 200 to 208 sends the flit held in the register 301 at the output stage to each of the port output sections 210 to 218, generates two kinds of mediation request signals and an OR signal, and sends the signals to a desired port output section (Step 1002).

When a header 1 flit is inputted to the register 301 at the output stage, each of the port input sections 200 to 208 generates a mediation request signal indicating the reception of the header 1 flit and sends the mediation request signal to a desired port output section. When a header 1 flit is inputted to the register 300 at the previous stage, each of the port input sections 200 to 208 generates a mediation request signal indicating the reception of the header 1 flit and sends the mediation request signal to a desired port output section. Further, each of the port input sections 200 to 208 generates an OR signal indicating that the mediation request signal of the output stage is being sent to any one of the port output sections 210 to 218, and sends the OR signal to all of the port output sections 210 to 218.

On the other hand, as shown in FIGS. 5 and 6, each of the port output sections 210 to 218 receives two kinds of the mediation request signals and the OR signal, from each of the port input sections 200 to 208, and also receives transmission permission signals, which are mediation results of the other port output sections. Each of the port output sections 210 to 218 includes the nine port request generating circuits 310 to 318, corresponding to the port input sections 200 to 208, respectively.

Each of the request generating circuits 310 to 318 judges whether one of the following two conditions is satisfied or not, from: the two kinds of the mediation request signals and the OR signal, sent from the corresponding port input section; and the OR signals of the transmission permission signals sent from all the port output sections 210 to 218 (Step 1003). A first condition indicates that there is a request inputted to the register at the output stage, and transmission permission for the request is not given. A second condition indicates that there is no request inputted to the register at the output stage, or transmission permission for a request inputted to the register at the output stage is already given and there is a request inputted to the register at the previous stage.

The port request generating circuits 310 to 318 make the mediation request valid if either of the conditions is satisfied (Step 1004), and make the mediation request invalid if neither of the conditions is satisfied (Step 1005).

The mediation circuit 320 performs mediation between ports based on the mediation requests, judged as described above and sent from the port input sections 200 to 208, and generates a transmission permission signal as a mediation result. The transmission permission signal generated by the mediation circuit 320 is used for control performed in the port output section via the register 322, and sent to each of the port input sections 200 to 208 via the register 323 to be used for control performed therein.

With this operation, even in a state where packets each made of one flit are continuously inputted whereby requiring mediation for each flit, it is possible to prevent the throughput from being decreased by giving a mediation request inputted to the register 300 at the previous stage, which is to be next outputted to the register 301 at the output stage, to the mediation circuit 320 when there is no mediation request inputted to the register 301 at the output stage, or when, even if there is a mediation request inputted thereto, its packet is to be next outputted.

Next, an operation example of the crossbar switch of this embodiment is described.

Figure 8:
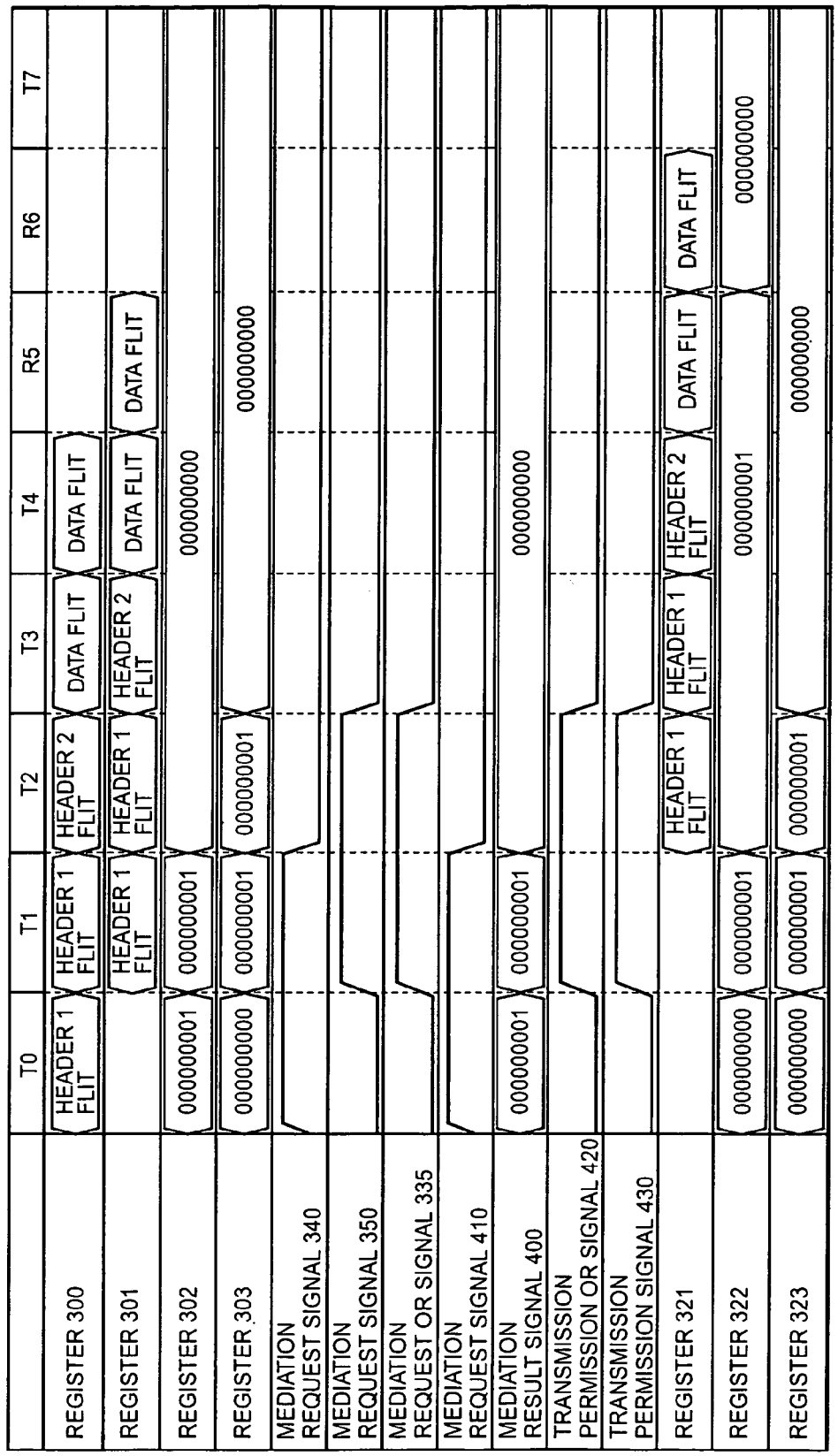
FIG. 8 is a time chart for explaining an operation of the crossbar switch according to the first embodiment.

FIG. 8 is a time chart for explaining an operation of the crossbar switch according to the first embodiment. With reference to FIG. 8, it is assumed that, at a first cycle T0, a header 1 flit destined for the port output section 210 is stored in the register 300, and no flit is stored in the register 301. It is also assumed that only the header 1 flit stored in the register 300 constitutes one packet.

The register 302 stores a value of "000000001 (binary)", and the register 303 stores a value of "000000000 (binary)". Then, the mediation request signal 340 is "1", the mediation request signal 350 is "0", and the mediation request OR signal 335 is "0", the signals 340, 350, and 335 being sent from the port input section 200 to the port output section 210.

In the port request generating circuit 310 of the port output section 210, since the mediation request signal 340 is "1" and the mediation request OR signal 335 is "0", the signal 514 is "1" and therefore the mediation request signal 410 of the port input section 200 is "1".

If the port input section 200 is selected through the mediation performed by the mediation circuit 320, the mediation result signal 400 has a value of "000000001 (binary)". At cycle T0, it is assumed that the register 322 has a value of "000000000 (binary)".

At cycle T1, the header 1 flit, which has been stored in the register 300, is set in the register 301. It is assumed that a new header 1 flit destined for the port output section 210 is set in the register 300, and a packet including this flit is composed of the header 1 flit, a header 2 flit, and two data flits.

The register 302 stores a value of "000000001 (binary)", and the register 303 stores a value of "000000001 (binary)".

The mediation request signal 340 is "1", the mediation request signal 350 is "1", and the mediation request OR signal 335 is "1", the signals 340, 350, and 335 being sent from the port input section 200 to the port output section 210.

A value of "000000001 (binary)" of the mediation result signal 400 is set in the registers 322 and 323. As a result, the transmission permission signal 430 is "1". Since the transmission permission signal 401 is "000000001 (binary)", the transmission permission OR signal 420 outputted from the bit OR circuit 325 is "1".

In the port request generating circuit 310 of the port output section 210, since the mediation request signal 340 is "1" and the transmission permission OR signal 420 is "1", the mediation request signal 410 is "1".

If the port input section 200 is selected through the mediation performed by the mediation circuit 320, the mediation result signal 400 has a value of "000000001 (binary)".

Upon reception of the port selection signal 403 having a value of "000000001 (binary)" from the register 322, the selector 324 selects and outputs the flit signal 334 outputted from the port input section 200. At this time, the header 1 flit stored in the register 301 is the last flit of the packet, so "last flag" of bit 64 in the flit signal 404 is "1".

At cycle T2, the header 1 flit, which has been stored in the register 301, is set in the register 321. Then, the transfer of the first packet from the port input section 200 to the port output section 210 is completed.

A second header 1 flit which has been stored in the register 300 is set in the register 301. The next header 2 flit is set in the register 300.

The register 302 stores a value of "000000000 (binary)", and the register 303 stores a value of "000000001 (binary)".

The mediation request signal 340 is "0", the mediation request signal 350 is "1", and the mediation request OR signal 335 is "1", the signals 340, 350, and 335 being sent from the port input section 200 to the port output section 210.

Since "last flag" of bit 64 in the flit signal 404 is "1", the register 322 stores a value of "000000001 (binary)" of the mediation result signal 400.

The register 323 stores a value of "000000001 (binary)" of the mediation result signal 400. As a result, the transmission permission signal 430 is "1". Since the transmission permission signal 401 has a value of "000000001 (binary)", the transmission permission OR signal 420 outputted from the bit OR circuit 325 is "1".

In the port request generating circuit 310 of the port output section 210, since the mediation request signal 340 is "0" and the transmission permission-OR signal 420 is "1", the mediation request signal 410 is "0".

At cycle T3, the second header 1 flit, which has been stored in the register 301, is set in the register 321. The header 2 flit, which has been stored in the register 300, is set in the register 301. A first data flit is set in the register 300.

The register 302 stores a value of "000000000 (binary)", and the register 303 stores a value of "000000000 (binary)".

The mediation request signal 340 is "0", the mediation request signal 350 is "0", and the mediation request OR signal 335 is "0", the signals 340, 350, and 335 being sent from the port input section 200 to the port output section 210.

Since "last flag" (bit 64) of the flit signal 404 is "0" and the register 322 has a value of "000000001 (binary)", the register 322 holds a value of "000000001 (binary)". The register 323 stores a value of "000000000 (binary)" of the mediation result signal 400.

At cycle T4, the header 2 flit, which has been stored in the register 301, is set in the register 321. The data flit, which has been stored in the register 300, is set in the register 301. A second data flit is set in the register 300.

The registers 302 and 303 each store a value of "000000000 (binary)".

Since "last flag" of the flit signal 404 is "0" and the register 322 has a value of "000000001 (binary)", the register 322 holds a value of "000000001 (binary)". The register 323 stores a value of "000000000 (binary)" of the mediation result signal 400.

At cycle T5, the data flit, which has been stored in the register 301, is set in the register 321. The second data flit, which has been stored in the register 300, is set in the register 301. An invalid flit is set in the register 300.

The registers 302 and 303 each store a value of "000000000 (binary)".

Since "last flag" of the flit signal 404 is "0" and the register 322 has a value of "000000001 (binary)", the register 322 holds a value of "000000001 (binary)". The register 323 stores a value of "000000000 (binary)" of the mediation result signal 400.

At cycle T6, the second data flit, which has been stored in the register 301, is set in the register 321. Invalid flits are set in the registers 300 and 301.

The registers 302 and 303 each store a value of "000000000 (binary)".

Since "last flag" of the flit signal 404 is "1", the register 322 stores a value of "000000000 (binary) " of the mediation result signal 400. The register 323 also stores a value of "000000000 (binary) " of the mediation result signal 400. Then, the transfer of the second packet from the port input section 200 to the port output section 210 is completed.

As described above, according to this embodiment, with a configuration in which the mediation circuit is provided in the port output section, the two head flits are stored in the registers 301 and 300 at the port input section, three mediation request signals (i.e., two kinds of mediation request signals and one mediation request OR signal) are sent from the port input section to the port output section, and a mediation result (transmission permission signal) is mutually sent and received between the port output sections, it is possible to allow a high-frequency operation by providing, for the mediation circuit 320, the registers 322 and 323 used to suppress a transmission path delay in a predetermined range, and to perform mediation without decreasing throughput even when packets each made of one flit are continuously inputted, by using a mediation request corresponding to the register 300 at the previous stage, in performing the mediation.

Further, in this embodiment, a signal obtained by applying the logical OR operation to mediation request signals destined for all the port output sections 210 to 218 is used as the mediation request OR signal 335, which is used to inform of the presence of a mediation request destined for any request destination, so signals destined for all the port output sections 210 to 218 can be generated at the common OR circuit 305, and a circuit scale can be reduced by reducing the number of signal lines between the port input sections and the port output sections.

Further, in this embodiment, in a typical configuration of the present invention where the mediation circuit 320 and the like are located in the port output section 210 and signal paths tend to be long, it is possible to allow both the prevention of a decreased throughput and the high-frequency operation.

Note that in this embodiment, the OR circuit 305 obtains a logical OR of mediation request signals destined for all the port output sections 210 to 218, and commonly sends the result to all the port output sections 210 to 218, but the present invention is not limited to this configuration. Since mediation request signals to port output sections are sent from the bit dividing section 306 separately from an output of the OR circuit 305, a logical OR may be obtained at the port output section and thus there is no need to obtain a logical OR of the mediation request signals to the port output section at the port input section. In this case, OR signals destined for respective port output sections may be generated individually. In this case, a mediation request signal destined for the port output section of a destination may not be inputted to the OR circuit, which generates the respective OR signals.

In this embodiment, the OR signal 335 obtained at the OR circuit 305 is sent to the respective port output sections 210 to 218. However, the present invention is not limited to this configuration. Signals before the logical OR operation (i.e., signals inputted to the OR circuit 305) may be individually sent to the respective port output sections and may be subjected to the logical OR operation at the port output sections.

As shown in FIG. 1, the crossbar switch of the present invention includes ports that are connected to the nodes and ports that are connected to the other crossbar switches. The description is mainly given of the ports connected to the nodes. In the crossbar switch of the present invention, the ports that are connected to the other crossbar switch can be configured or operated in the same way as the ports that are connected to the nodes.

Further, in this embodiment, an example is shown in which a mediation section including the port request generating circuits 310 to 318, the bit OR circuit 325, the mediation circuit 320, and the registers 322 and 323 is configured in the port output section 210. However, the present invention is not limited thereto. The mediation section may be configured outside the port output section. For example, the corresponding mediation section may be placed close to each port output section. Alternatively, the mediation section may be placed at the middle of the port input section and the port output section.

Second Embodiment

In some cases, in an information processor having a plurality of processor nodes and a plurality of I/O nodes, the plurality of processor nodes and the plurality of I/O nodes are divided into plural partitions and used. Crossbar switches provided for such an information processor are divided by the plural partitions and used. Port input sections or port output sections included in the crossbar switches may be shared by the plural partitions.

In the case where the crossbar switches are used by being divided into plural partitions, when a failure occurs in one partition to cause a state where a packet cannot be received in the partition, packets that cannot be sent are stuck at the port input section that is shared by plural partitions including the failed partition. In this case, there is a problem in that packets cannot be handled in a partition that is normally operated, as well, leading to a situation where plural partitions go down. A second embodiment has been made to solve this problem.

An information processor of the second embodiment has the same configuration as that shown in FIG. 1.

Figure 9:
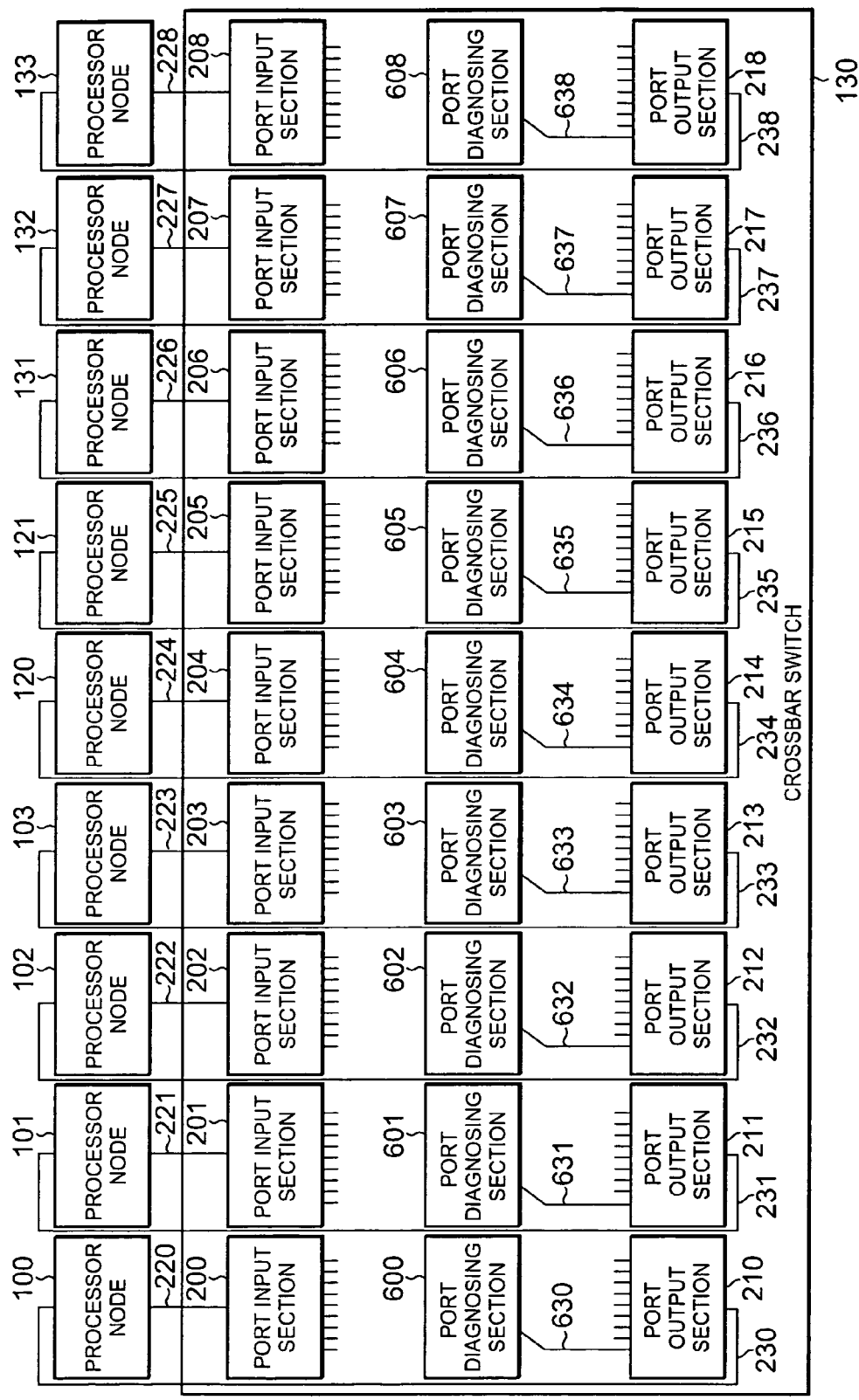
FIG. 9 is a block diagram showing a configuration of a crossbar switch according to a second embodiment.

FIG. 9 is a block diagram showing a configuration of a crossbar switch according to the second embodiment. Referring to FIG. 9, the crossbar switch of the second embodiment is different from that of the first embodiment in that port diagnosing sections 600 to 608 for diagnosing the port input sections 200 to 208 and the port output sections 210 to 218 are included. A description is given of only the port diagnosing section 600 since all the port diagnosing sections 600 to 608 have the same configuration.

The port diagnosing section 600 diagnoses a failure related to a pair of the port input section 200 and the port output section 210. When detecting a fatal failure occurring in the port input section 200 or the port output section 210, or when detecting a fatal failure occurring in a partition to which the port input section 200 and the port output section 210 belong, the port diagnosing section 600 sets a failure notification signal 630 to have a value of "1". It is assumed here that the failure notification signal 630 is kept to have a value of "1" in a period of time during which a partition cannot operate due to a failure.

Fatal failures in a partition include those in a processor node that belongs to the partition, in an I/O node that belongs to the partition, in another port included in the same crossbar switch that belongs to the partition, and in a port included in another crossbar switch that belongs to the partition.

Failures in the port input section, the port output section, the processor node, the I/O node, and the like may be detected by a method that is generally used. Any method may be used among various methods using hardware, software, and the like that are obvious to those skilled in the art.

A method of notifying the port diagnosing section 600 of the occurrence of a failure, from the processor node, the I/O node, another crossbar switch, and another port of the same crossbar switch is not particularly limited. Methods that are well known to those skilled in the art use a special packet for failure notification or provide a special interface.

The port output section of the crossbar switch according to the second embodiment has a different configuration from that shown in FIGS. 5 and 6.

Figure 10:
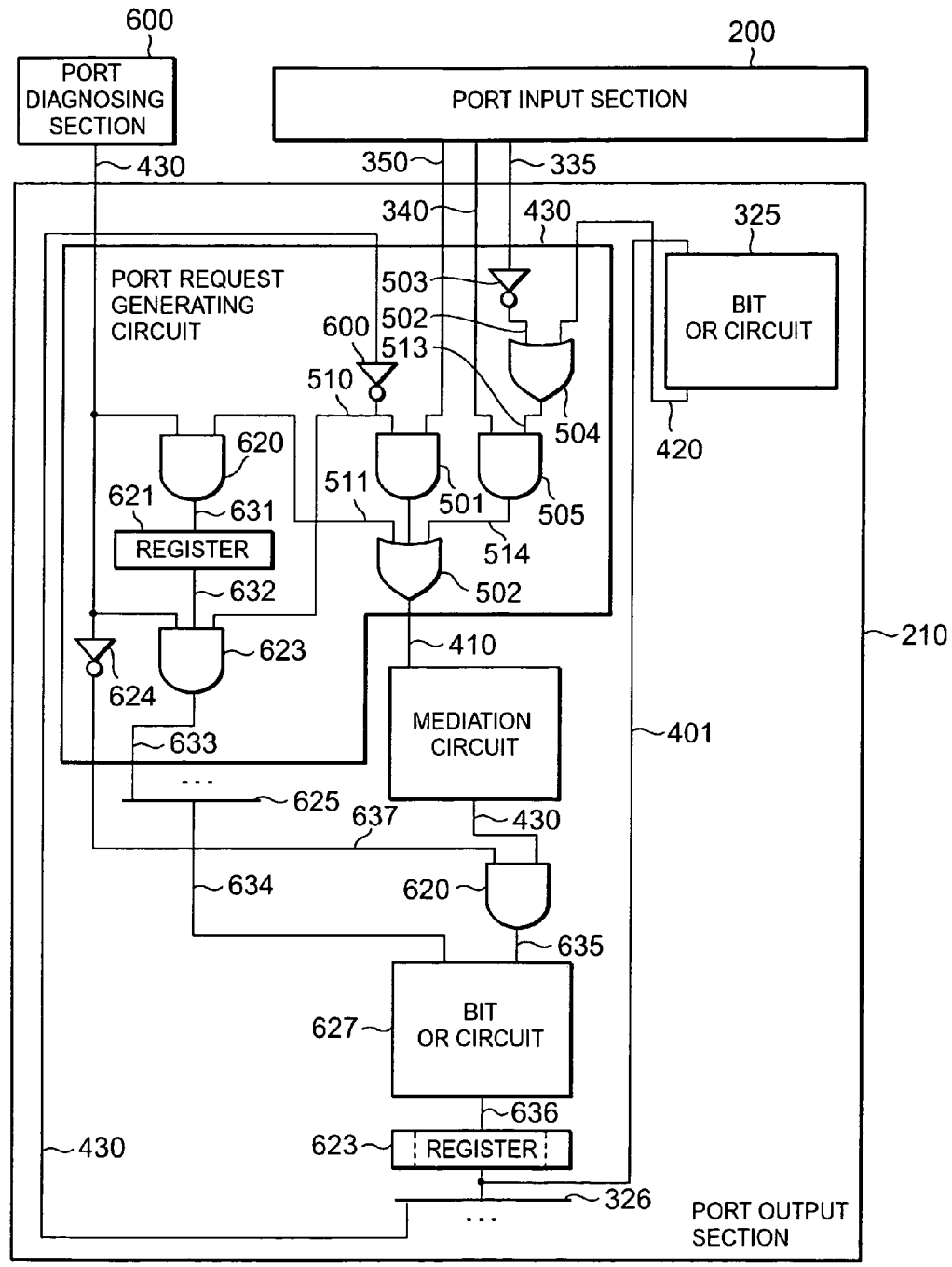
FIG. 10 is a block diagram showing a detailed configuration of a port output section according to the second embodiment.

FIG. 10 is a block diagram showing the detailed configuration of the port output section of the second embodiment. Referring to FIG. 10, the port output section 210 of the second embodiment includes a port request generating circuit 610, the mediation circuit 320, the bit OR circuit 325, an AND circuit 626, a bit OR circuit 627, the register 323, a bit bundling section 625, and the bit dividing section 326.

In the port request generating circuit 610 of FIG. 10, a portion including the NOT circuits 503 and 500, the OR circuits 502 and 504, and the AND circuits 501 and 505 is the same as the port request generating circuit 310 shown in FIG. 6.

The AND circuit 620 obtains a logical AND of the failure notification signal 630 and the signal 511, and outputs the result to a register 621 as a signal 631. The register 621 stores the signal 631 outputted from the AND circuit 620 for each cycle, and outputs the result to an AND circuit 623 as a signal 632.

The AND circuit 623 obtains a logical AND of the failure notification signal 630, the output signal 632, and the signal 510, and outputs the result to the bit bundling section 625 as a signal 633. The bit bundling section 625 bundles the signal 633 and similar signals outputted from the other eight port request generating circuits, and outputs a resultant signal to the bit OR circuit 627 as a signal 634 having 9 bits.

The AND circuit 626 obtains a logical AND of a signal 637 which is obtained by inverting the failure notification signal 630 at a NOT circuit 624, and the mediation result signal 400 outputted from the mediation circuit 320, and outputs the result to the bit OR circuit 627 as a signal 635. The mediation-result signal 400 outputted from the mediation circuit 320 has 9 bits, so the AND circuit 626 obtains a logical AND of the signal 637 and each of the 9 bits of the mediation result signal 400. Thus, the signal 635 has also 9 bits. The bit OR circuit 627 obtains a logical OR of the signal 634 having 9 bits and the signal 635 having 9 bits for each bit position, and outputs the result to the register 323 as a signal 636 having 9 bits.

Figure 11:
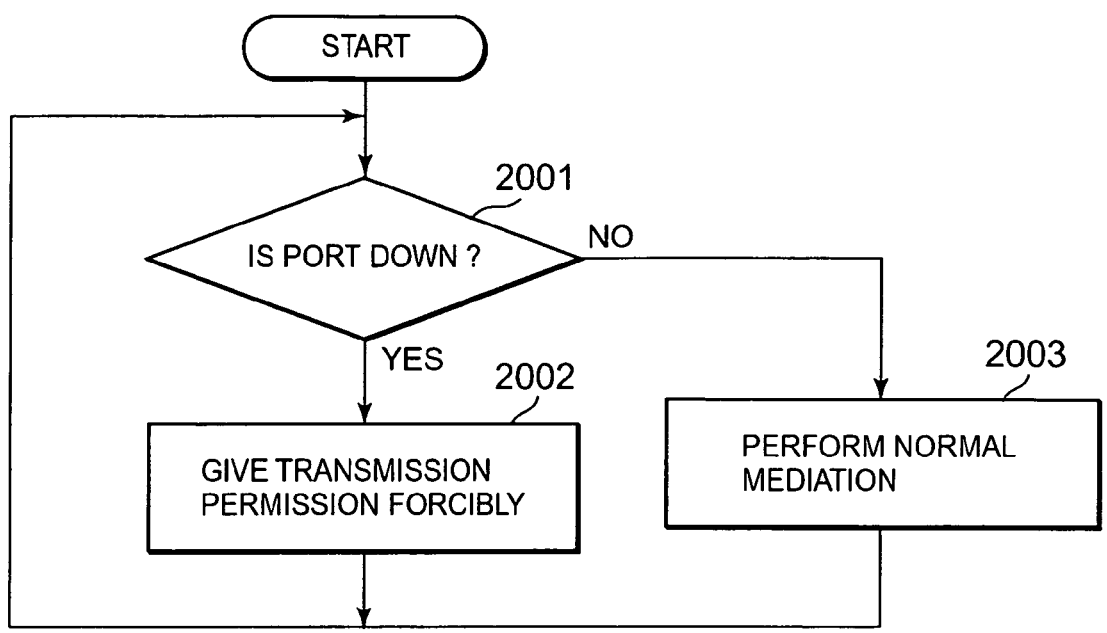
FIG. 11 is a flowchart showing an operation of the crossbar switch according to the second embodiment.

FIG. 11 is a flowchart showing an operation of the crossbar switch according to the second embodiment. With reference to FIG. 11, the crossbar switch according to the second embodiment judges at the port diagnosing section 600 whether a partition to which each port belongs is down or not (Step 2001). When a failed partition is detected, the port request generating circuit of the port output section that belongs to the failed partition forcibly gives transmission permission to a mediation request sent thereto (Step 2002). Accordingly, packets of the failed partition sent from the port input section that also belongs to another partition can be taken out and discarded.

When no failed partition is detected, the port request generating circuit performs normal judgment and mediation as shown in FIG. 7 (Step 2003). The series of operations is performed for each port output section.

Next, a description is given of an operation example of the crossbar switch of this embodiment.

Figure 12:
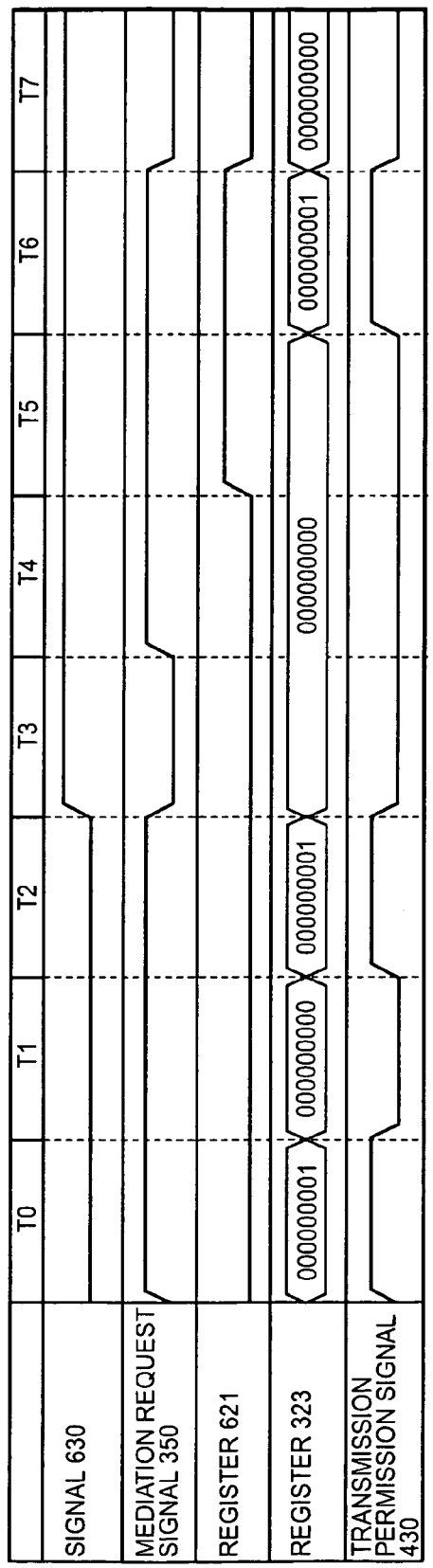
FIG. 12 is a time chart for explaining the operation of the crossbar switch according to the second embodiment.

FIG. 12 is a time chart for explaining the operation of the crossbar switch of the second embodiment. Referring to FIG. 12, at cycle T3 and subsequent cycles, the failure notification signal 630 sent from the port diagnosing section 600 is set to "1".

At cycle T0, the mediation request signal 350 is set to "1", and at the same cycle, the transmission permission signal 430 with respect to the mediation request thereof is set to "1".

At cycle T1, the mediation request signal 350 is set to "1", and at cycle T2, the transmission permission signal 430 with respect to the mediation request thereof is set to "1". A normal operation without failure is described so far.

At cycle T4 after the occurrence of a failure, the mediation request signal 350 is set to "1". Since the failure notification signal 630 is "1", the signal 635 outputted from the AND circuit 626 has a value of "000000000 (binary)" without depending on a value of the mediation result signal 400 outputted from the mediation circuit 320.

At cycle T5, a value of "1" of the mediation request signal 350 is set in the register 621, and the transmission permission signal 430 is "0", so the signal 633 has a value of "1".

If all signals corresponding to the signals 633 of the other port request generating circuits are "0", the signal 634 has a value of "000000001 (binary)".

The bit OR circuit 627 obtains a logical OR of "000000000 (binary)" and "000000001 (binary)" for each bit, so the signal 636 has a value of "000000001 (binary)".

At cycle T6, the value of "000000001 (binary)" of the signal 636 is set in the register 323, and the transmission permission signal 430 has a value of "1". Accordingly, the port input section 200 can start the packet transfer, from cycle T6.

As described above, when a partition to which the port output section 210 belong is down, the port request generating circuit 610 of the port output section 210 of this embodiment sets a signal indicating transmission right acquisition (i.e., transmission permission) to "1" without conditions, with respect to a mediation request sent from a port input section belonging to another partition that is normally operated, to take out and discard a packet of a port input section that is shared by the failed partition. Therefore, it is possible to prevent packets from being stuck at the port input section belonging to another partition that shares the port output section with the failed partition.

Third Embodiment

As described above, in some cases, in an information processor having a plurality of processor nodes and a plurality of I/O nodes, the plurality of processor nodes and the plurality of I/O nodes are divided into plural partitions and used. Crossbar switches provided for such an information processor are divided by the plural partitions and used. Port input sections and port output sections included in the crossbar switches may be shared by the plural partitions.

In such crossbar switches, when a failure occurs in the port input section while a packet is being transferred from the port input section to the port output section and this failure causes a state where the port input section cannot send flits, the port output section keeps waiting for the remaining flits that are not yet received. In this case, there is a problem in that packets of another partition that shares the port output section in the crossbar switch cannot be processed, leading to a situation where plural partitions go down. A third embodiment has been made to solve this problem.

A crossbar switch of the third embodiment has the same configuration as that of the first embodiment shown in FIG. 2.

Figure 13:
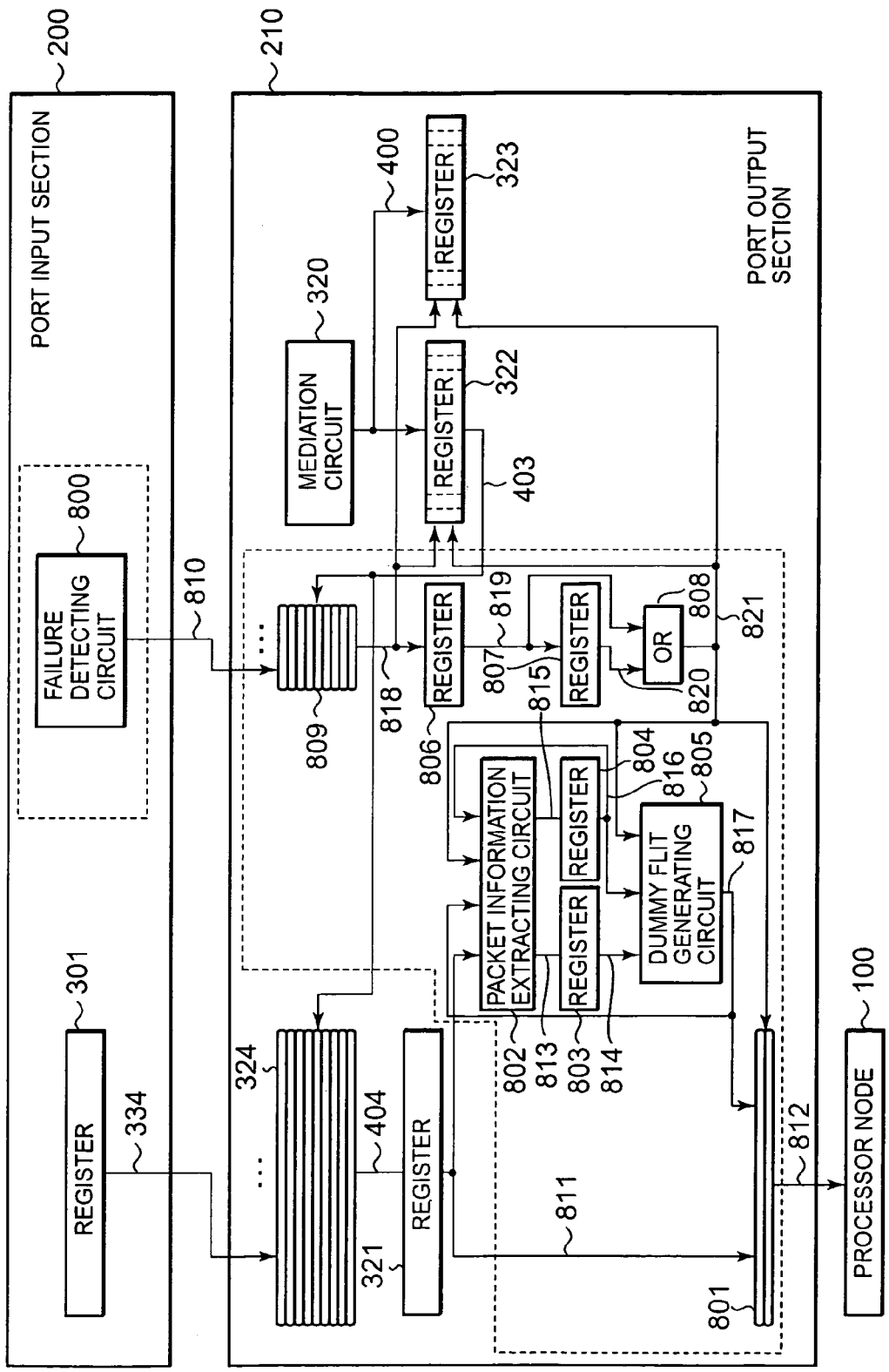
FIG. 13 is a block diagram showing a detailed configuration of a port input section and a port output section of a crossbar switch according to a third embodiment.

FIG. 13 is a block diagram showing a detailed configuration of a port input section and a port output section of the crossbar switch according to the third embodiment. In FIG. 13, portions having the same configurations as those of the first embodiment shown in FIG. 5 are not illustrated for ease of understanding. Portions unique to the third embodiment are surrounded by dashed lines in FIG. 13.

The port input section 200 of the third embodiment is different from that of the first embodiment in that a failure detecting circuit 800 is included. When detecting a fatal failure occurring in the port input section 200, the failure detecting circuit 800 sets a failure notification signal 810 to "1".

The failure notification signal 810 is inputted to a selector 809 of the port output section 210. In addition to the failure notification signal 810 from the port input section 200, similar failure notification signals (not shown) from all the other port input sections 201 to 208 are inputted to the selector 809.

Similarly to the above-mentioned selector 324, the selector 809 selects a signal of a port input section that is allowed to send a packet by the mediation, according to the port selection signal 403 outputted from the register 322, and outputs the selected signal to the registers 806, 322, and 323 as a signal 818. If a fatal failure occurs in a port input section while a packet is being transferred from the port input section to the port output section, the signal 818 is set to "1".

The register 806 stores the signal 818 for each cycle.

In this embodiment, if at least one of the signal 818 and a signal 821 has a value of "1", the registers 322 and 323 are reset to "000000000 (binary)" at the next cycle.

A packet information extracting circuit 802 calculates the number of remaining flits of the packet being transferred, from the output signal 821 of an OR circuit 808, an output signal 811 of the register 321, an output signal 817 of a dummy flit generating circuit 805, and an output signal 816 of a register 804. Then, the packet information extracting circuit 802 outputs to the register 803, a signal 813 having 1 bit which indicates whether a header 2 flit is included in the flits to be transferred of the packet being transferred. Further, the packet information extracting circuit 802 outputs to the register 804 a signal 815 indicating the number of data flits included in the flits to be transferred of the packet being transferred.

The register 803 has a width of 1 bit and indicates whether a header 2 flit is included in the flits to be transferred of the packet being transferred. A value of "0" indicates that a header 2 flit is not included, and a value of "1" indicates that a header 2 flit is included.

The register 803 is set to a value obtained by decoding "header type" of bit 63 to bit 56 in the register 321 when the signal 821 has a value of "0", and "strobe" of bit 67 to bit 65 in the register 321 has a value of "100 (binary)". When "header type" has a value of "00 (hexadecimal)", the register 803 is set to "0". When "header type" has a value of "01 (hexadecimal)", the register 803 is set to "1".

The register 803 is reset to "0" when the signal 821 has a value of "0", and "strobe" of bit 67 to bit 65 in the register 321 has a value of "010 (binary)" indicating the header 2 flit.

The register 803 is reset to "0" when the signal 821 has a value of "1", and "strobe" of bit 67 to bit 65 in the signal 817 has a value of "010 (binary)" indicating the header 2 flit.

The register 804 has a width of 5 bits and indicates the number of data flits included in the flits to be transferred of the packet being transferred. The number of data flits included in the packet is sixteen at maximum, so the register 804 can have a value in a range from "00000 (binary)" to "10000 (binary)".

The register 804 is set to a value obtained by decoding "data length" of bit 55 to bit 48 in the register 321 when the signal 821 has a value of "0", and "strobe" of bit 67 to bit 65 in the register 321 has a value of "100 (binary)". When "data length" is "00 (hexadecimal)", the register 804 is set to "00000 (binary)". When "data length" is "01 (hexadecimal)", the register 804 is set to "00001 (binary)". When "data length" is "02 (hexadecimal)", the register 804 is set to "00010 (binary)" When "data length" is "03 (hexadecimal)", the register 804 is set to "00100 (binary)". When "data length" is "04 (hexadecimal)", the register 804 is set to "01000 (binary)". When "data length" is "05 (hexadecimal)", the register 804 is set to "10000 (binary)".

The register 804 is set to a value obtained by subtracting "1" from the output signal 816 of the register 804 when the signal 821 has a value of "0", and "strobe" of bit 67 to bit 65 in the register 321 has a value of "001 (binary)". For example, when the signal 821 has a value of "0", "strobe" of bit 67 to bit 65 in the register 321 has a value of "001 (binary)", and the register 804 stores a value of "10000 (binary)", the register 804 stores a value of "01111(binary)" at the next cycle.

The register 804 is set to a value obtained by subtracting "1" from the output signal 816 of the register 804 when the signal 821 has a value of "1", and "strobe" of bit 67 to bit 65 in the signal 817 has a value of "001 (binary)".

An output signal 814 of the register 803, the output signal 816 of the register 804, and the output signal 821 of the OR circuit 808 are inputted to the dummy flit generating circuit 805. The dummy flit generating circuit 805 generates the same number of dummy flits as that of the remaining flits, which cannot be transferred due to a failure of a port input section that is sending the packet, and outputs the generated dummy flits to the selector 801 as the flit signal 817 having 68 bits.

When the signal 821 has a value of "0", the flit signal 817 has a value of "00000000000000000 (hexadecimal)", which means that the dummy flit generating circuit 805 outputs an invalid flit.

When the signal 821 has a value of "1", values of bit 67 to bit 65 ("strobe") in the flit signal 817 and the bit 64 ("last flag") are determined according to the values of the registers 803 and 804. When the register 803 has a value of "1" and the register 804 has a value of "00000 (binary)", "strobe" of bit 67 to bit 65 in the flit signal 817 has a value of "010 (binary)", and "last flag" of bit 64 therein has a value of "1". When the register 803 has a value of "1" and the register 804 has a value in a range from "00001 to 10000 (binary)", "strobe" of bit 67 to bit 65 in the flit signal 817 has a value of "010 (binary)", and "last flag" of bit 64 therein has a value of "0". When the register 803 has a value of "0" and the register 804 has a value in a range from "00010 to 10000 (binary)", "strobe" of bit 67 to bit 65 in the flit signal 817 has a value of "001 (binary)", and "last flag" of bit 64 therein has a value of "0". When the register 803 has a value of "0" and the register 804 has a value of "00001 (binary)", "strobe" of bit 67 to bit 65 in the flit signal 817 has a value of "001 (binary)", and "last flag" of bit 64 therein has a value of "1". When the register 803 has a value of "0" and the register 804 has a value of "00000 (binary)", "strobe" of bit 67 to bit 65 in the flit signal 817 has a value of "000 (binary)", and "last flag" of bit 64 therein has a value of "0".

When the signal 821 is "1", any fixed value, e.g., "0000000000000000 (hexadecimal)", may be set in bit 63 to bit 0 in the flit signal 817. Further, the bit 63 to bit 0 of the flit signal 817 and ECC code may be combined to generate specific code to be used for fault management of the information processor.

The selector 801 selects one of the flit signal 811 outputted from the register 321 and the flit signal 817 outputted from the dummy flit generating circuit 805 according to a value of the output signal 821 of the OR circuit 808, and outputs the selected signal to the processor node 100 as a flit signal 812. The selector 801 selects the flit signal 811 when the signal 821 has a value of "0", and selects the flit signal 817 when the signal 821 has a value of "1".

A register 807 has a width of 1 bit. When an output signal 819 of the register 806 has a value of "1", if at least one bit of the register 803, having a 1-bit width, and the register 804, having a 5-bit width, has a value of "1", the register 807 is set to "1". When the register 807 has a value of "1", if the register 803 has a value of "0" and the register 804 has a value of "00000 (binary)", the register 807 is reset to "0". In the other cases, the register 807 holds the value of "1".

The OR circuit 808 obtains a logical OR of the output signal 819 of the register 806 and an output signal 820 of the register 807, and outputs the result to the packet information extracting circuit 802, the dummy flit generating circuit 805, the selector 801, and the registers 822 and 823 as the signal 821.

Figure 14:
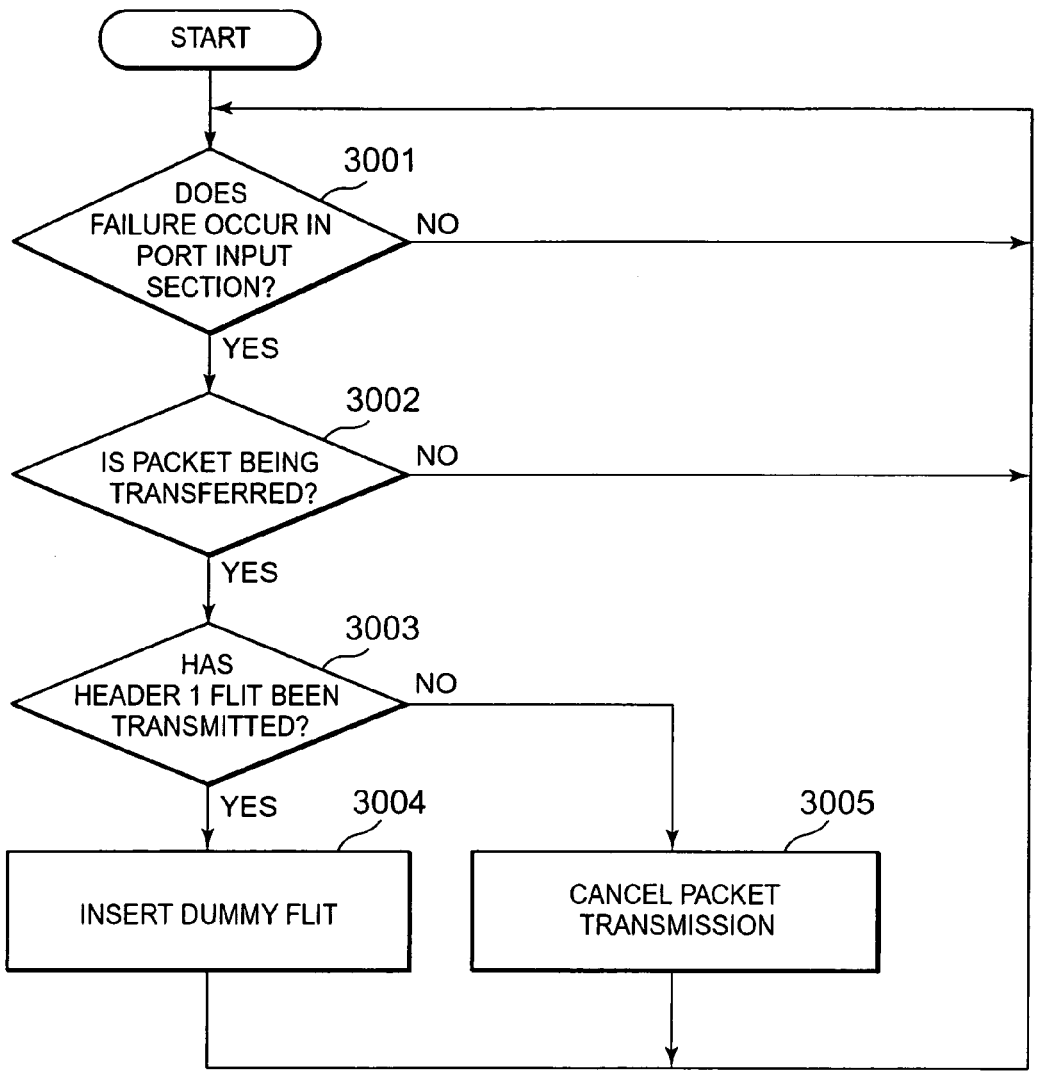
FIG. 14 is a flowchart showing an operation of the crossbar switch according to the third embodiment.

Next, a description is given of an operation of the crossbar switch according to this embodiment. FIG. 14 is a flowchart showing the operation of the crossbar switch according to the third embodiment. Referring to FIG. 14, the crossbar switch judges the presence or absence of a failure occurring in the port input section 200 at the failure detecting circuit 800 (Step 3001). If a failure occurs in the port input section 200, the port output section 210 judges whether the port input section 200 is transferring a packet or not (Step 3002).

If the port input section 200 is transferring a packet, the port output section 210 judges whether a header 1 flit of the packet has already been sent to the port output section 210 (Step 3003). In the example of FIG. 13, if the transfer of a header 1 flit from the port input section 200 and the assertion of a failure notification signal are performed at the same cycle, it is judged that a header 1 flit has not been sent yet.

If a header 1 flit has already been sent, the port output section 210 inserts a dummy flit working as the remaining flit at the dummy flit generating circuit 805 to complete the packet transfer (Step 3004). On the other hand, if a header 1 flit has not been sent, the port output section 210 makes the packet transfer completed without sending the packet including the header 1 flit (Step 3005).

Next, a description is given of an operation example of the crossbar switch of this embodiment.

Figure 15:
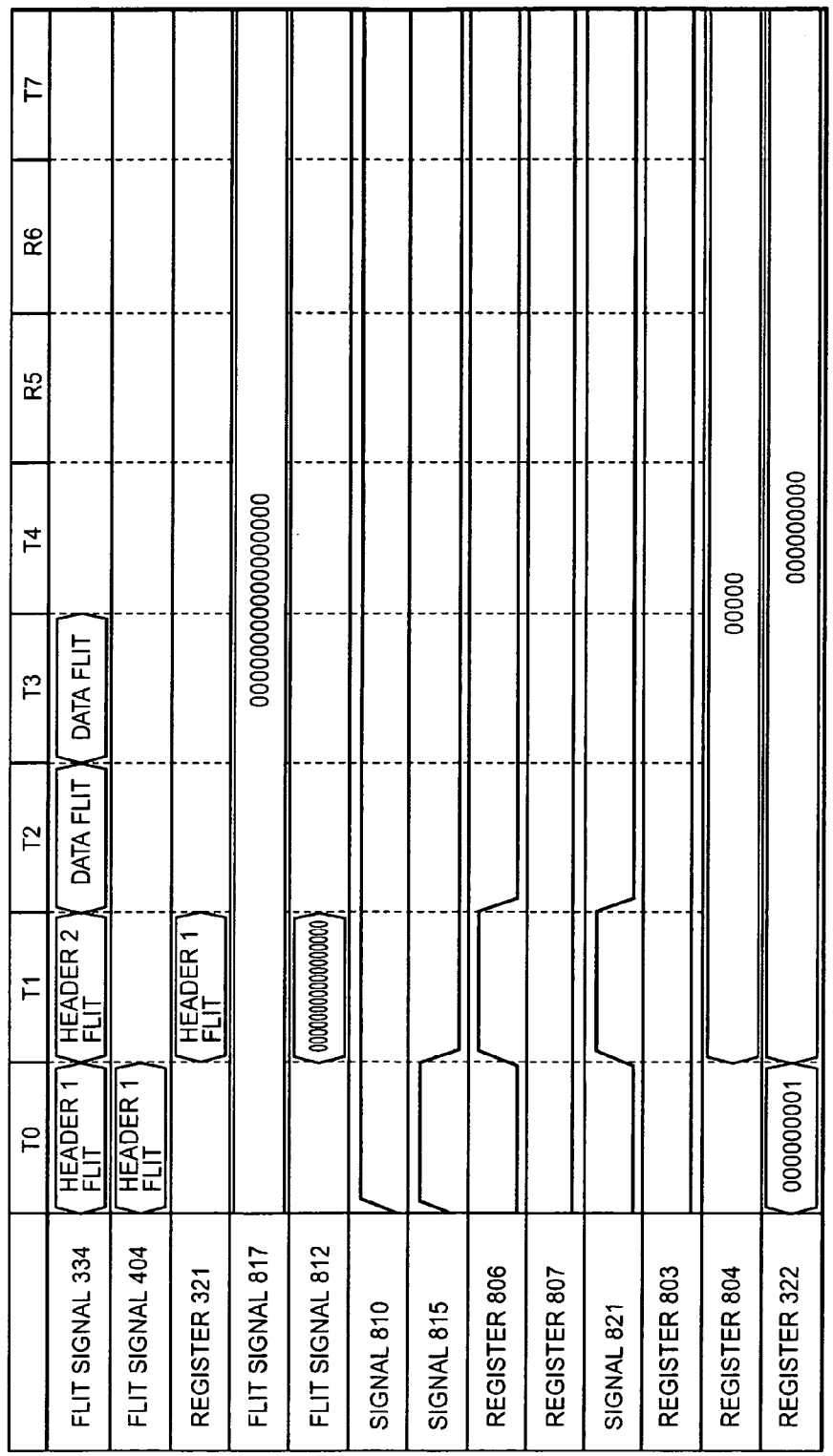
FIG. 15 is a time chart for explaining the operation of the crossbar switch according to the third embodiment.

FIG. 15 is a time chart for explaining the operation of the crossbar switch of the third embodiment. FIG. 15 shows an operation performed when a failure occurs in the port input section before outputting of a packet to a node is started.

Referring to FIG. 15, at the first cycle, T0, the port input section 200 outputs a header 1 flit as the flit signal 334, and at the same time, detects a failure in the port input section 200 and asserts the failure notification signal 810 to "1".

At cycle T1, the register 322 is reset to "000000000 (binary)", and thus the output signal 818 of the selector 809 has a value of "0". The flit signal 334 outputted from the port input section 200 at cycle T0 is set in the register 321 via the selector 324.

The signal 821 is set to "1" at cycle T1, so the selector 801 selects the flit signal 817 outputted from the dummy flit generating circuit 805. At this time, the register 803 has a value of "0" and the register 804 has a value of "00000 (binary)", so the flit signal 817 becomes an invalid flit having a value of "00000000000000000 (hexadecimal)".

Since the signal 821 is set to "1" at cycle T1, no value is set in the registers 803 and 804 at cycle T2.

Since the register 803 has a value of "0" and the register 804 has a value of "00000 (binary)" at cycle T1, no value is set in the register 807 at cycle T2.

Since the signal 821 is set to "0" at cycle T2, a new mediation request becomes ready to be accepted.

With this operation, if the failure notification signal 810 is asserted at the same time when a header 1 flit is transferred, a packet sent from the port input section in which a failure is detected can be discarded before outputting of the packet to the processor node 100 is started.

Figure 16:
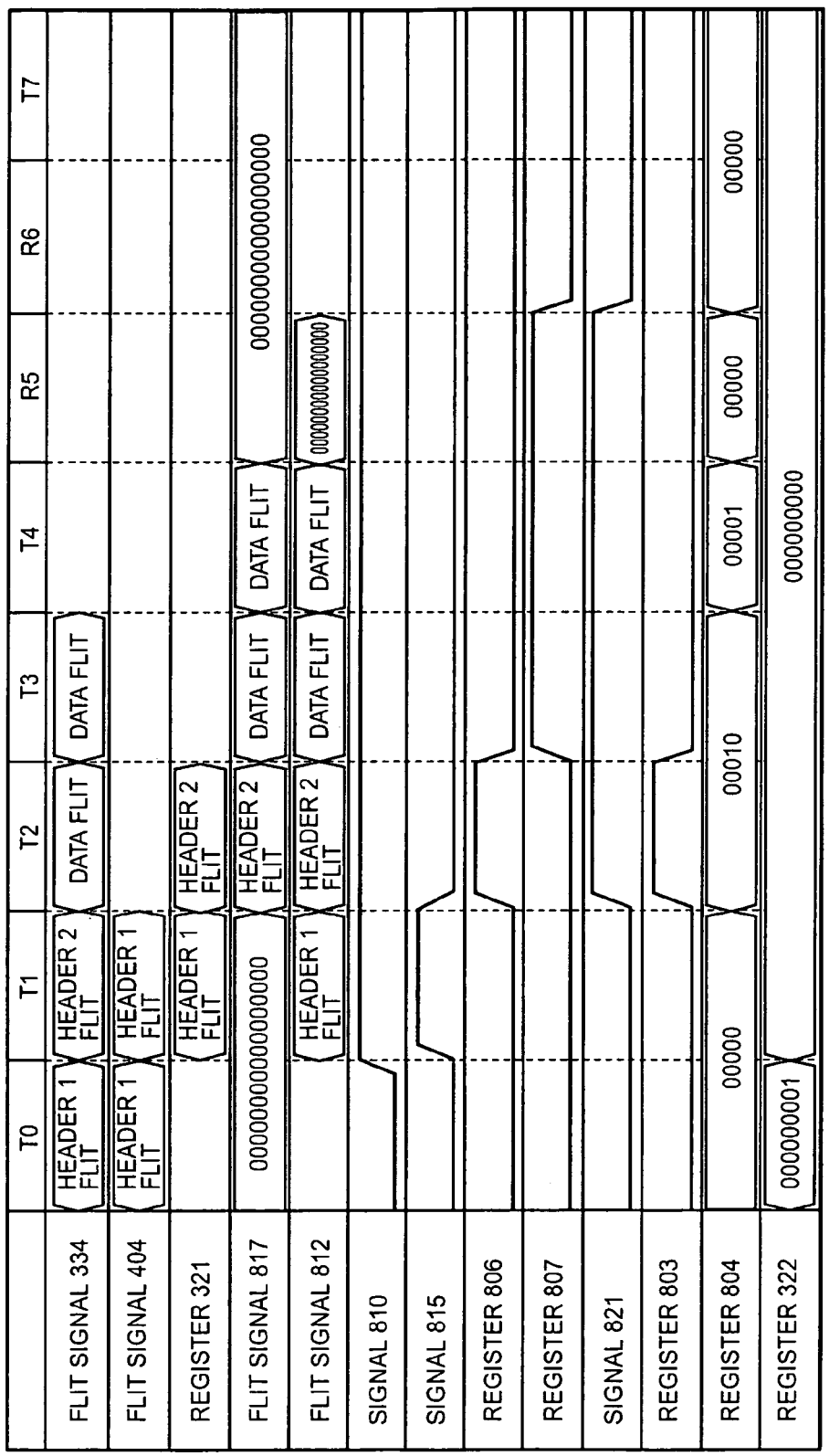
FIG. 16 is a time chart for explaining another operation of the crossbar switch according to the third embodiment.

FIG. 16 is a time chart for explaining another operation of the crossbar switch according to the third embodiment. FIG. 16 shows an operation performed when a failure occurs in the port input section after outputting of a packet to a node is started.

Referring to FIG. 16, at the first cycle, T0, the port input section 200 outputs a header 1 flit as the flit signal 334. It is assumed that the packet is composed of the header 1 flit, a header 2 flit, and two data flits.

At cycle T1, the port input section 200 outputs the header 2 flit as the flit signal 334, and at the same time, detects a fatal failure in the port input section 200 and asserts the failure notification signal 810 to "1". The register 322 has a value of "000000001 (binary)", so the selector 809 selects the failure notification signal 810 and thus the signal 818 has a value of "1". The header 1 flit outputted as the flit signal 334 at cycle T0 is set in the register 321.

At cycle T2, the register. 322 is reset to "000000000 (binary)", and as a result, the output signal 818 of the selector 809 has a value of "0". The register 806 stores the signal 818 to have a value of "1". Accordingly, the output signal 821 of the OR circuit 808 has a value of "1".

The output signal 821 of the OR circuit 808 has a value of "0" at cycle T1, so a value obtained by decoding the header 1 flit stored in the register 321 is set in the registers 803 and 804 at cycle T2. The packet includes the header 2 flit and two data flits, so the register 803 is set to "1" and the register 804 is set to "00010 (binary)". Accordingly, the flit signal 817 outputted from the dummy flit generating circuit 805 becomes a dummy header 2 flit in which "strobe" of bit 67 to bit 65 has a value of "010 (binary)", "last flag" of bit 64 has a value of "0", and bit 63 to bit 0 have a value of "000000000000000 (hexadecimal)". Since the signal 821 is "1", the selector 801 selects the flit signal 817. As a result, the header 2 flit outputted from the dummy flit generating circuit 805 is outputted to the processor node 100 as the flit signal 812.

At cycle T3, the register 807 is set to "1" which is a value outputted from the register 806. Thus, the signal 821 still holds a value of "1". Since the header 2 flit is outputted from the flit signal 817 at cycle T2, the register 803 has a value of "0". The flit signal 817 outputted from the dummy flit generating circuit 805 becomes a dummy data flit in which "strobe" of bit 67 to bit 65 has a value of "001 (binary)", "last flag" of bit 64 has a value of "0", and bit 63 to bit 0 have a value of "0000000000000000 (hexadecimal)". Since the signal 821 has a value of "1", the selector 801 selects the flit signal 817. As a result, the flit signal 812 becomes the data flit outputted from the dummy flit generating circuit 805.

At cycle T4, the register 807 keeps holding a value of "1", so the signal 821 still holds "1". At cycle T3, the data flit is outputted from the flit signal 817, so "1" is subtracted from the register 804 to become "00001 (binary)". The flit signal 817 outputted from the dummy flit generating circuit 805 becomes a dummy flit in which "strobe" of bit 67 to bit 65 has a value of "001 (binary)", "last flag" of bit 64 has a value of "1", and bit 63 to bit 0 have a value of "0000000000000000 (hexadecimal)". Since the signal 821 has a value of "1", the selector 801 selects the flit signal 817. As a result, the flit signal 812 becomes the data flit outputted the dummy flit generating circuit 805.

At cycle T5, the register 807 keeps holding a value of "1", so the signal 821 still holds "1". At cycle T4, the data flit is outputted from the flit signal 817, so "1"is subtracted from the register 804 to become "00000(binary)". The flit signal 817 outputted from the dummy flit generating circuit 805 becomes an invalid flit having a value of "00000000000000000 (hexadecimal)", because the register 803 has a value of "0" and the register 804 has a value of "00000 (binary)". Since the signal 821 is "1", the selector 801 selects the flit signal 817.

As a result, the flit signal 812 becomes the invalid flit outputted from the dummy flit generating circuit 805.

At cycle T6, the register 807 is reset to "0". As a result, the normal mediation is restarted from cycle T7.

As described above, according to this embodiment, the port input section notifies the port output section of a state where a flit cannot be sent, and the port output section generates and outputs a dummy flit working as the remaining flit of the packet being transferred. Therefore, it is possible to prevent a situation where the port output section keeps waiting for the remaining flit, and to prevent another partition that shares the port output section from being down.

At this time, when the occurrence of a failure is notified from the port input section at the same time when a header 1 flit of the packet is transferred, the port output section discards the packet without outputting the packet, and resets a register that stores a mediation request. As a result, it is possible to avoid an adverse effect on a node, caused by sending a packet including a header whose content may be destroyed due to a failure occurring in the port input section. On the other hand, when the occurrence of a failure is notified from the port input section after outputting of the packet is started, the port output section outputs a dummy flit working as the remaining flit of the packet and resets a register that stores a mediation request.

Note that if it is not necessary to prevent a packet including a header whose content may be destroyed from being sent, the packet may be completed with a dummy flit working as the remaining flit of the packet irrespective of whether the header 1 flit has been sent or not.

What is claimed is

1. A crossbar switch provided between a plurality of nodes, for transferring a packet which is made of at least one flit between the plurality of nodes, comprising:

a plurality of port input sections each connected to any one of the plurality of nodes, for storing each flit which composes the packet, sequentially, in a first register serving as an output stage and a second register serving as a previous stage of the output stage, for generating a first mediation request signal destined for a desired request destination when a head flit of the packet is stored in the first register, for generating a second mediation request signal destined for the desired request destination when the second register receives the head flit from the first register and stores the received head flit, for generating a first notification signal which is used to notify whether or not the first mediation request signal destined for any request destination is present, and for, upon reception of a mediation result signal obtained through mediation using the first mediation request signal, the second mediation request signal, and the first notification signal, outputting a flit stored in the first register according to the mediation result signal and sequentially forwarding the flit stored in the first register to the second register;

a plurality of port output sections each connected to any one of the plurality of nodes and to all the plurality of port input sections, and for, upon reception of the mediation result signal, sequentially outputting to the node which is a desired request destination the flit outputted from the first register of any one of the plurality of port input sections according to the mediation result signal; and a plurality of mediation sections provided corresponding to the plurality of port output sections, and each including, at one of a previous stage and a subsequent stage of a mediation circuit, a register for suppressing a delay of the mediation result signal caused by a transmission path in a predetermined range, the plurality of mediation sections each functioning, upon reception of the first mediation request signal and the second mediation request signal destined therefor, and the first notification signal, which are sent from each of the plurality of port input sections, to transmit and receive each mediation result signal between the plurality of mediation sections as a second notification signal, to perform mediation at the mediation circuit based on the first mediation request signal, the second mediation request signal, the first notification signal, and the second notification signal, and to give the mediation result signal to the port input section and the port output section.

2. A crossbar switch according to claim 1, wherein the plurality of mediation sections each include a port request generating circuit for making a mediation request sent from each of the plurality of port input sections valid and giving the mediation request to the mediation circuit in one of a case where the port input section has the first mediation request signal and is not given a transmission permission for the first mediation request signal, a case where the port input section does not have the first mediation request signal, and a case where the port input section has the first mediation request signal, is already given the transmission permission for the first mediation request signal, and has the second mediation request signal.

3. A crossbar switch according to claim 1, wherein:

the plurality of port input sections and the plurality of port output sections make pairs, the pairs each connecting to the same node;

the crossbar switch further comprises a port diagnosing section for diagnosing a failure related to one of the pairs; and upon reception of a notification of a failure related to the pair of the port input section and the port output section from the port diagnosing section, the corresponding mediation section forcibly gives a transmission permission for the first mediation request signal destined therefor.

4. A crossbar switch according to claim 3, wherein the plurality of nodes are divided into a plurality of partitions and used.

5. A crossbar switch according to claim 1, wherein:

the port input section has a failure detecting circuit for detecting a failure occurring in the port input section and for notifying the port output section of the failure; and while the failed port input section is transferring a packet destined for the node, the port output section inserts a dummy flit working as a remaining flit to the packet being transferred to the node, and completes the transmission of the packet to the node.

6. A crossbar switch according to claim 5, wherein when the failure occurs and if the packet being transferred from the failed port input section has not yet started to be transmitted to the node, the port output section completes the packet transmission without sending the packet.

7. A crossbar switch according to claim 6, wherein when the failure is notified at the same time when the head flit of the packet is transferred, the port output section judges that the transmission of the packet is not started.

8. A crossbar switch according to claim 5, wherein the port output section calculates the number of dummy flits to be inserted, from a header included in the head flit.

9. A crossbar switch according to claim 1, wherein the first notification signal is obtained by applying a logical OR operation to all first mediation request signals destined for all of the plurality of mediation sections.

10. A crossbar switch according to claim 1, wherein each of the plurality of mediation sections is disposed inside the corresponding one of the plurality of port output sections.

11. A crossbar switch according to claim 1, wherein part of the plurality of port input sections and part of the plurality of port output sections are mutually connected via crossbar switches instead of the nodes.

12. An information processor, comprising:

a plurality of nodes for transmitting/receiving a packet which is made of at least one flit to/from each other; and a crossbar switch for transferring the packet between the nodes, the crossbar switch comprising:

a plurality of port input sections each connected to any one of the plurality of nodes, for storing each flit which composes the packet, sequentially, in a first register serving as an output stage and a second register serving as a previous stage of the output stage, for generating a first mediation request signal destined for a desired request destination when a head flit of the packet is stored in the first register, for generating a second mediation request signal destined for the desired request destination when the second register receives the head flit from the first register and stores the received head flit, for generating a first notification signal which is used to notify whether or not the first mediation request signal destined for any request destination is present, and for, upon reception of a mediation result signal obtained through mediation using the first mediation request signal, the second mediation request signal, and the first notification signal, outputting a flit stored in the first register according to the mediation result signal and sequentially forwarding the flit stored in the first register to the second register;

a plurality of port output sections each connected to any one of the plurality of nodes and to all the plurality of port input sections, and for, upon reception of the mediation result signal, sequentially outputting to the node which is a desired request destination the flit outputted from the first register of any one of the plurality of port input sections according to the mediation result signal; and a plurality of mediation sections provided corresponding to the plurality of port output sections, and each including, at one of a previous stage and a subsequent stage of a mediation circuit, a register for suppressing a delay of the mediation result signal caused by a transmission path in a predetermined range, the plurality of mediation sections each functioning, upon reception of the first mediation request signal and the second mediation request signal destined therefor, and the first notification signal, which are sent from each of the plurality of port input sections, to transmit and receive each mediation result signal between the plurality of mediation sections as a second notification signal, to perform mediation at the mediation circuit based on the first mediation request signal, the second mediation request signal, the first notification signal, and the second notification signal, and to give the mediation result signal to the port input section and the port output section.

13. An information processor according to claim 12, wherein the plurality of mediation sections each include a port request generating circuit for making a mediation request sent from each of the plurality of port input sections valid and giving the mediation request to the mediation circuit in one of a case where the port input section has the first mediation request signal and is not given a transmission permission for the first mediation request signal, a case where the port input section does not have the first mediation request signal, and a case where the port input section has the first mediation request signal, is already given the transmission permission for the first mediation request signal, and has the second mediation request signal.

14. An information processor according to claim 12, wherein:

the plurality of port input sections and the plurality of port output sections make pairs, the pairs each connecting to the same node;

the crossbar switch further comprises a port diagnosing section for diagnosing a failure related to one of the pairs; and upon reception of a notification of a failure related to the pair of the port input section and the port output section from the port diagnosing section, the corresponding mediation section forcibly gives a transmission permission for the first mediation request signal destined therefor.

15. An information processor according to claim 12, wherein:

the port input section has a failure detecting circuit for detecting a failure occurring in the port input section and for notifying the port output section of the failure; and while the failed port input section is transferring a packet destined for the node, the port output section inserts a dummy flit working as a remaining flit to the packet being transferred to the node, and completes the transmission of the packet to the node.

16. An information processor according to claim 15, wherein when the failure occurs and if the packet being transferred from the failed port input section has not yet started to be transmitted to the node, the port output section completes the packet transmission without sending the packet.

17. A transfer method of transferring a packet made of at least one flit between the plurality of nodes by a crossbar switch connected to the plurality of nodes, comprising the steps of:

storing each flit which composes the packet, sequentially, which are sent from the plurality of nodes connected to a plurality of ports1 in a first register serving as an output stage and a second register serving as a previous stage of the output stage;

generating a first mediation request signal destined for a desired one of the plurality of ports when a head flit of the packet is stored in the first register, generating a second mediation request signal destined for the desired one of the plurality of ports when the head second register receives the head flit from the first register and stores the received head flit, and generating a first notification signal which is used to notify whether or not the first mediation request signal destined for any request destination is present; and in a mediation section including, at one of a previous stage and a subsequent stage of a mediation circuit, a register for suppressing a signal delay caused by a transmission path in a predetermined range, performing mediation for each port at the mediation circuit based on the first mediation request signal, the second mediation request signal, the first notification signal, and a second notification signal which includes mediation results of the other ports, and transferring the packet between the plurality of ports according to a mediation result.

18. A transfer method according to claim 17, further comprising the step of making a mediation request with respect to the mediation circuit sent from one of the plurality of ports valid in one of a case where the port input section has the first mediation request signal and is not given a transmission permission for the first mediation request signal, a case where the port input section does not have the first mediation request signal, and a case where the port input section has the first mediation request signal, is already given the transmission permission for the first mediation request signal, and has the second mediation request signal.

19. A transfer method according to claim 17, further comprising the step of giving, when a failure related to one of the plurality of ports occurs, a transmission permission for a first mediation request for the port.

20. A transfer method according to claim 19, further comprising the step of completing the packet transmission without sending the packet if the packet being transferred from the port in which the failure has occurred has not yet started to be transmitted to the node.

21. A transfer method according to claim 17, further comprising the step of, when a failure occurs in one of the plurality of ports that has received a packet, inserting a dummy flit working as a remaining flit to the packet, which is being sent to the node from the port, and completing the transmission of the packet to the node.

* * * * *